(12) United States Patent
Ide

(10) Patent No.: US 7,265,511 B2
(45) Date of Patent: Sep. 4, 2007

(54) MOTOR CONTROL DEVICE

(75) Inventor: Yuuji Ide, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 166 days.

(21) Appl. No.: 10/549,727

(22) PCT Filed: Mar. 17, 2004

(86) PCT No.: PCT/JP2004/003566

§ 371 (c)(1),
(2), (4) Date: Sep. 19, 2005

(87) PCT Pub. No.: WO2004/083978

PCT Pub. Date: Sep. 30, 2004

(65) Prior Publication Data

US 2006/0208683 A1    Sep. 21, 2006

(30) Foreign Application Priority Data

| Mar. 17, 2003 | (JP) | ............................. 2003-072244 |
| Mar. 24, 2003 | (JP) | ............................. 2003-081041 |
| Mar. 24, 2003 | (JP) | ............................. 2003-081055 |

(51) Int. Cl.
*G05B 11/36* (2006.01)
(52) U.S. Cl. ...................... 318/609; 318/807; 318/822; 318/629; 318/650
(58) Field of Classification Search ............... 318/609, 318/807, 822, 629, 650; 388/800, 814
See application file for complete search history.

(56) References Cited

U.S. PATENT DOCUMENTS

| 6,204,622 B1 | 3/2001 | Tsuruta |
| 2002/0121394 A1* | 9/2002 | Kamen et al. ................. 180/41 |
| 2004/0113582 A1* | 6/2004 | Ide .............................. 318/717 |

FOREIGN PATENT DOCUMENTS

| JP | 10-254550 | 9/1998 |
| JP | 2001-075650 | 3/2001 |
| JP | 2001-242904 | 9/2001 |

* cited by examiner

*Primary Examiner*—Karen Masih
(74) *Attorney, Agent, or Firm*—Rankin, Hill, Porter & Clark LLP

(57) ABSTRACT

A speed controller includes a speed integration compensation low-pass filter, an integral control system, a proportional control system, and a multiplication device means. The speed integration compensation low-pass filter has a transfer function corresponding to a delay of a speed control system. The integral control system 136 is multiplied by an integral gain by a multiplier and integrated by a speed integrator before being supplied to an adder. The adder adds an output of the proportional control system and an output of the integral control system and outputs the result to the multiplier, which in turn multiplies the output of the adder by a proportional gain and outputs the result as a torque command. The multiplication means multiplies the output of the integral control system and the output of the proportion control system by a speed proportional gain and outputting the value of the torque command.

10 Claims, 22 Drawing Sheets

(Feed forward gain 0%)

(Feed forward gain 50%)

(Feed forward gain 100%)

( Feed forward gain 100%
A delay compensation low-pass filter in the speed
control unit is applied.
Differential gain is set. )

MOTOR CONTROL DEVICE

TECHNICAL FIELD

The present invention relates to a motor controller used for machine tools, and more specifically to a motor speed controller, a current controller for controlling a primary current in a motor and a motor position controller for positioning at high speed.

BACKGROUND ART

An example of a conventional motor speed controller is shown in FIG. 23 (refer to FIG. 1 in Japanese Patent Laid-open Publication No. 254550/1998). In this controller, a subtractor SB in a speed control unit 3 calculates a difference between a fed-back speed, obtained by a speed calculation unit 2 converting the fed-back position output from an encoder E, and the speed indicated by the speed control unit 3. This difference is processed by the speed control unit 3 to output a torque command, which outputs a torque command to a torque control unit 4. The torque control unit 4 controls a current flowing into a motor M so as to cause the motor M to produce a torque as required by a torque command.

Normally, the speed control unit 3 in this controller is constructed as a proportional-integral control (PI-control) unit. In this PI-control unit, a difference between the speed indicated by the speed command and the fed-back speed is calculated by a subtractor SB, and is passed through a proportional control system with a gain of 1 to an adder AD. In the integral control system, the difference is multiplied by an integral gain by a multiplier 31 and integrated by a speed integrator 32 before being supplied to the adder AD. The adder AD adds an output of the proportional control system and an output of the integral control system and outputs the result to the multiplier 33, which in turn multiplies the output of the adder AD by a proportional gain and outputs the result as a torque command. By constructing the speed control unit 3 as a PI-control unit, it is possible to minimize not only a transient difference of speed but also a regular difference. Furthermore, an integration of the speed difference can improve an ability of suppressing disturbance applied to a motor.

Generally, control systems have a limited response, which means that a fed-back speed takes long to respond to an output speed command. Upon receiving the speed command, the motor begins to rotate. However, after the speed command has been output until the fed-back speed is obtained (until the fed-back speed corresponding to the speed command appears), the speed integrator 32 performs an integrating operation. While the motor is rotating at a constant speed, the integrated value decreases. But as the motor M decelerates, the integrating operation is performed again. All the remaining integrated value is discharged, and the motor M stops. Thus, in the conventional controller, after the speed command has become zero, the speed response is delayed for an amount corresponding to the residual quantity of the remaining integrated value in the speed integrator. As a result, there has been a problem that a speed integral gain can not be increased since an over shoot occurs in a fed-back speed.

There has been a controller as shown in FIG. 24 as a conventional current controller of a motor. In this controller, each of current differences between each of the current commands of a d-axial current and a q-axial current and each of a d-axial fed-back current and a q-axial current detected by a current detector D is calculated by the subtractor means SBb. Each of the current differences calculated by the subtractor means SBa and SBb are input to the current control unit 4a and 4b to obtain a d-axial voltage command and a q-axial voltage command. Each of the voltage commands is d-q converted and two-phase to three-phase converted in coordinate converter 15a to produce a converted command. The motor M is driven by the PWM inverter 17, basing on the converted command from the coordinate converter 15a to produce a converted command. A fed-back current is produced by d-q converting a three-phase current detected by the current detector D in the coordinate converter 15b. The coordinate converter 1b performs a three-phase to two-phase convert and a d-q convert, basing on a signal from a signal generation means 18 for generating the signal corresponding to a rotating position of an encoder E.

Normally, each of the current control units 4a and 4b in this controller is comprised of a PI controller. The current control unit 4a, for example, is composed of an integral control system (I system) and the proportional control system (P system), as shown in FIG. 25. In the integral control system, a current difference between a current indicated by a current command and a fed-back current is calculated by a subtraction means SBa, and the current difference is multiplied by an integral gain of a multiplication means 191. The multiplied value is integrated by a current integrator 193. In the proportional control system, a current difference calculated by a subtraction means SBa is multiplied by a constant. The current control unit 4a, furthermore, adds an output of the integral control system and an output of the proportional control system by an addition means to output an added value, and multiply the added value by the proportional gain in a multiplication means 195 to output a voltage commands. Thus a regular difference as well as transient difference of currents can be suppressed.

Generally, control systems have a limited response, which means that a motor current takes long to respond to a output current command. Upon receiving the current command, the motor current begins to flow. However, after the voltage command has been output from the current control unit 4a until the motor current appears, the current integrator 193 performs an integrating operation. Thus, in the conventional current controller, the current response is delayed for an amount corresponding to the residual quantity of the remaining integrated value in the current integrator 193, which might have caused an overshoot.

In a controller which is shown in Japanese Patent Laid Open Publication No. 66075/1996, a delay of a fed-back current is calculated from an amount of variation of a current command, a motor inductance, and a motor resistance. This delay of the fed-back current is added to the current differential unit to perform a compensation. A differential ingredient such as the amount of variation of the current command tend to make a command response vibrate, which is not preferable to realize a smooth control. In addition the constants such as a motor inductance and the motor resistance are required. A value of the motor inductance varies depending on an amount of a motor current, the motor resistance varies depending on a temperature. Therefore, the controller needs a compensation with a consideration of an amount of the motor current, and a temperature of the motor.

An example of a conventional motor position controller is shown in FIG. 26 (refer to FIG. 1 in Japanese Patent Laid-open Publication No. 254550/1998). In this controller, a subtractor in a position control unit calculates a difference between the position indicated by the position command and a fed-back position. This difference is processed by the position control unit to output a speed command. A subtractor in a speed control unit 3 calculates a difference between a speed indicated by a speed command and a fed-back speed, obtained by a speed calculation unit 2 converting the feedback position output from an encoder E. This difference is processed by the speed control unit 3, which outputs a torque command to a torque control unit 4. The torque control unit 4 controls a current flowing into a motor M so as to cause the motor M to produce a torque as required by a torque command.

Normally, the position control unit 1 in this controller is constructed as a proportional control (P-control) unit constructed the speed control unit 3 is constructed as a proportional-integral control (PI-control) unit. The conventional PI-control unit constructing the speed control unit 3 has a constitution shown in FIG. 27. In this PI-control unit, a difference between the speed indicated by the speed command and the fed-back speed is calculated by a subtractor SB, and is input to an adder AD through a proportional control system with a gain of 1. In the integral control system, the difference is multiplied by an integral gain in a multiplier 31 and integrated by a speed integrator 32 before being supplied to the adder AD. The adder AD adds an output of the proportional control system and an output of the integral control system, and sends the result to a multiplier 33, which in turn multiplies the output of the adder AD by a proportional gain and outputs the result as d torque command. By constructing the speed control unit 3 as a PI-control unit, it is possible to minimize not only a transient difference of speed but also a regular difference.

Japanese Patent Laid Open Publication No. 15911/1991 discloses a controlling method of a servo motor. In this method, a controlled variable of fed-forward position obtained by differentiating a position command is added to a controlled variable obtained by a position loop control to output a speed command. The controlled variable of fed-forward speed obtained by differentiating the controlled variable of fed-forward position is added to a variable obtained by a speed loop control to output a current command, which can enhance a response to obtain a stable servo system.

In the conventional controller, there has been a problem that an overshoot becomes larger by increasing a feed forward gain to 100%, while the followability is improved by increasing the feed forward gain. Since an overshoot deteriorates the processing quality, it needs to be suppressed as much as possible. FIG. 15 shows a simulation of a position control operation when a feed forward gain is set to 0% in the conventional controller. As shown in FIG. 15, an overshoot is smaller when a feed forward gain is smaller. However, as shown in FIG. 17, an overshoot is larger when the feed forward gain is set to 100%. Therefore conventionally, the followability has been improved within a range of a smaller overshoot, with the feed forward gain being set to around 50% as shown in FIG. 16.

Control-theoretically, in the feed forward control, it is recommended that a manipulated variable is determined by reverse operation so that the controlled variable approaches to a target value when the characteristics of a controlled object are known. In a conventional control system, the manipulated variable is a speed command and the controlled variable is a position, when a controlled object for performing a position control is taken as a speed control system. When the speed control system is expressed in the most simple model similar to the speed control system, the speed control system can be expressed in a primary delay system. When a reverse function of the controlled object is taken, the speed control system is expressed in a primary advance system. Since this procedure conventionally has been carried out with a constant compensation, a delay of higher order can not be compensated. As a result an overshoot has occurred.

There has been another factor, which regards a speed command to be output from the position controller. Normally, control systems have a limited response, which means that a speed feedback takes long to respond to a speed feed forward command. Upon receiving the speed feed forward command, the motor begins to rotate. However, a speed command is output from a position control unit depending on a position difference produced after the speed feed forward command has been output until the speed feedback responds. This position difference decreases while a motor rotates at constant speed, however, the position difference is produced when the motor slows down. As a result, the speed to output the speed command is output.

As described above, since the speed command produced by the position difference is added to the speed feed forward command, more speed commands are output than necessary. Thus, an overshoot has occurred.

Another factor of a problem has been in a speed controller. A speed controller is generally composed in PI control, as shown in FIG. 27. FIG. 15 to 17 show a result of a simulation when a conventional speed controller is used. Control systems have a limited response, which means that a speed feedback takes a long time to respond upon receiving a speed command. During the time, a speed integrator performs integration. This integrator charges and discharges electricity, which causes the speed controller to take longer to respond. Thus an overshoot has occurred. As described above, in the conventional control unit, the three reasons have caused an overshoot. The three reasons are that functions in a feed forward system are composed in a proportional system, a position control system is constructed without considering a delay of responses in a speed system, and that a speed controller is constructed without considering responses of a speed control system. Therefore a feed forward gain can not be increased up to 100%. Accordingly, there has been a problem that there is a limitation to increase the followability.

The present invention solves the above problems, and aims to provide a motor controller with less overshoots.

Another purpose of the invention is to provide a high-speed motor controller with less overshoots, highly capable of suppressing disturbance.

The purpose of the invention is to provide a current controller with less overshoots, highly capable of speeding up a current response in a current control system at a higher speed without adding a motor parameter.

The purpose of the invention is to provide a motor position controller with less overshoots and the higher followability, capable of increasing a feed forward gain up to 100%.

DISCLOSURE OF THE INVENTION

A motor controller of the present invention comprises a position detection unit, a speed calculation unit, a speed control unit and a torque control unit. The position detection unit detects a position of a motor to be controlled. The speed calculation unit calculates a speed of the motor from the position of the motor detected by the position detection unit. The speed control unit performs a speed control, basing on a proportional-integral control by outputting a torque command so that the speed fed back from the speed calculation unit is consistent with the speed indicated by the speed command. The torque control unit performs a torque control, basing on the torque command.

In a controller of this invention, the speed control unit comprises a speed integration compensation low-pass filter, an integral control system, a proportional control system, an addition means, and a multiplication means. The speed integration compensation low-pass filter has a transfer function corresponding to a delay of a speed control system. The integral control system includes a speed integrator, which integrates a speed difference between a speed indicated by a delay speed command and the speed of the motor. The delay speed command is obtained by inputting the speed command into the delay compensation low-pass filter. The proportional control system outputs a command proportional to a difference between the speed indicated by the speed command and the speed of the motor. The addition means adds an output of the integral control system and an output of the proportional control system. The multiplication means multiplies an output of the addition means by a speed proportional gain to produce the torque command. In the proportional control system, the speed difference may be multiplied by the speed proportional gain and, in the integral control system, the operand to be controlled may be multiplied by the speed proportional gain before being output.

With the use of the speed integration compensation low-pass filter, in this invention, the difference between the speed indicated by the speed command with a delay corresponding to the delay of the speed control system and the actually delayed fed-back speed can be rendered nearly zero. This makes the residual quantity in the speed integrator almost zero, thus an overshoot of a fed-back speed can be reduced.

When the accuracy of the position detection unit (e.g., encoder) is low, ripples caused by quantization errors and position errors may be included in the speed feedback signal. To address this problem, it is preferable to provide a speed feedback low-pass filter which has a transfer function for preventing ripples, caused by quantization errors and/or position errors detected by the position detection unit, from appearing in the torque command. In this case, the proportional control system includes a subtraction means for calculating a difference between the speed indicated by the speed command and the filtered speed which is obtained by inputting the speed into the speed feedback low-pass filter. If the position detection unit used has high accuracy and resolution, the position errors become smaller, and then this configuration is not necessary to be adopted.

The present invention concerns to a motor controller which comprises a current detection unit, a current control unit, and a driving means. The current detection unit detects a motor current flowing in a motor to be controlled. The current control unit outputs a voltage command, basing on a current difference between a current indicated by a current command and a fed-back current based on the motor current. The motor current is detected by the current detection unit. The driving means supplies the motor current to the motor, basing on the voltage command. In this invention, the current control unit comprises a delay compensation low-pass filter in the current control unit, an integral control system, a proportional control system, an addition means, and a multiplication means. The delay compensation low-pass filter in the current control unit has a transfer function corresponding to a delay of a current control system. The integral control system includes a current integrator for integrating a current difference between a current indicated by a delay current command and a fed-back current. The delay current command is obtained by inputting the current command into the delay compensation low-pass filter in the current control unit. The proportional control system outputs a command proportional to the current difference between the fed-back current and the current indicated by the current command. The addition means adds an output of the integral control system and an output of the proportional control system. A multiplication means multiplies an output of the addition means by a current proportional gain to output the voltage command.

A current proportional gain can be multiplied by a current difference in a proportional control system, and an operand to be controlled can be multiplied by a current proportional gain in an integral control system.

With the use of the delay compensation low-pass filter in the current control system, a current difference between a current indicated a current command with a delay corresponding to a delay of the current control system and an actually delayed fed-back current can be rendered nearly zero. Thus an overshoot can be decreased.

Furthermore, this invention concerns to a motor controller which comprises a position detection unit, a speed calculation unit, a position control unit, a speed control unit, and a torque control unit. The position detection unit detects a position of a motor to be controlled. The speed calculation unit calculates a speed of the motor. The position control unit performs a position control by outputting a speed command so that the motor position fed back from the position detection unit is consistent with a position indicated by a position command. The speed control unit performs a speed controls basing on a proportional-integral control by outputting a torque command so that the speed fed back from the speed calculation unit is consistent with the speed indicated by the speed command. The torque control unit performs a torque control, basing on the torque command. The position control unit comprises a subtraction means, a position loop multiplication means, a differentiator, a feed forward gain multiplication means, a proportional differentiation means, a feed forward low-pass filter, and an addition means. The subtraction means calculates a position difference between the position indicated by the position command and the position detected by the position detection unit. The position loop multiplication means multiplies the position difference by a position proportional gain. The differentiator differentiates the position command. The feed forward gain multiplication means multiplies an output of the differentiator by a feed forward gain. The proportional differentiation means controls an output of the feed forward gain multiplication means, basing on a proportional differentiation control to compensate a delay of a speed control system. The feed forward low-pass filter has a transfer function for removing ripples caused by quantization errors in the position command, and filters an added value of an output of the proportional differentiation means and an output of the feed forward gain multiplication means. The addition means adds an output of the feed forward low pass filter and an output of the position loop multiplication means to output the speed command.

According to in this invention, a feed forward multiplication output performs a proportional integral control in the position control unit, so that the characteristics of a primary advance can be obtained. Thus a delay of the speed control system can be compensated and the followability to a position command can be enhanced. With the use of a delay compensation low-pass filter in the speed control unit, a difference between a speed indicated by a speed command with a delay corresponding to a delay of the speed control system and an actually delayed fed-back speed can be rendered nearly zero. When the feed forward gain is increased to 100%, a control system with less overshoots can be also constructed, which realizes to perform a position control with the higher followability. Furthermore, the use of a feed forward low-pass filter prevents ripples from being involved in the speed command itself. The ripples based on quantization errors are generated because of the presence of the position command unit.

Further provided is a delay compensation low-pass filter in the position control unit having a transfer function corresponding to a delay of the speed control system. A position difference between a position command which has passed through the delay compensation low-pass filter in the position control unit and a fed-back position can be input into the position loop multiplication means.

When a difference between an output of the differentiator for differentiating a position command and a differential value of a position is integrated by the integrator to output a position difference, a delay compensation low-pass filter in a position control unit having a transfer function corresponding a delay of a speed control system is applied between at the differentiator and the integrator. And then a difference between an output of the differentiator which has passed through the delay compensation low-pass filter in a position control unit and a differential value of a position can be input to the integrator.

By applying such a delay compensation low-pass filter in the position control unit, a position command input into the position control unit, and a fed-back position signal rise almost simultaneously when accelerating. Accordingly the speed command from the position control unit becomes considerably smaller. When the above mentioned construction is employed, the speed feed forward gain can be increased to 1 or close to 1, which improves the followability to the position command.

In this invention, the speed control unit comprises a delay compensation low-pass filter in the speed control unit in the speed control unit has a transfer function corresponding to a delay of a speed control system. The integral control system includes a speed integrator, which integrates a speed difference between a speed indicated by a delay speed command and the speed of the motor. The delay speed command is obtained by inputting the speed command into the delay compensation low-pass filter in the speed control unit. The proportional control system outputs a command proportional to a difference between the speed indicated by the speed command and the speed of the motor. The addition means adds an output of the integral control system and an output of the proportional control system. The multiplication means multiplies an output of the addition means by a speed proportional gain to produce the torque command. In the proportional control system, the speed difference may be multiplied by the speed proportional gain and, in the integral control system, the operand to be controlled may be multiplied by the speed proportional gain before being output. With the use of the delay compensation low-pass filter in the speed control unit as proposed in this invention, the difference between the speed indicated by the speed command with a delay corresponding to the delay of the speed control system and the actually delayed fed-back speed can be rendered nearly zero. This makes the residual quantity in the speed integrator almost zero, thus the followability to a position command can be improved.

When the accuracy of the position detection unit (e.g., encoder) is low, ripples caused by quantization errors and position errors may be included in the speed feedback signal. To address this problem, it is preferable to provide a speed feedback low-pass filter which has a transfer function for preventing ripples, caused by quantization errors and/or position errors detected by the position detection unit, from appearing in the torque command. In this case, the proportional control system includes a subtraction means for calculating a difference between the speed indicated by the speed command and the filtered speed which is obtained by inputting the speed into the speed feedback low-pass filter. If the position detection unit used has high accuracy and resolution, the position errors become smaller, and then this configuration is not necessary to be adopted The position control unit preferably comprises a subtraction means and a position loop multiplication means. The subtraction means calculates a position difference between the position indicated by the position command and the position detected by the position detection unit. The position loop multiplication means multiplies the position difference by the position proportional gain. In this case, it is preferred that the position control unit further includes a differentiator for differentiating the position command, a multiplication means for multiplying the output of the differentiator by the feed forward gain, and a feed forward low-pass filter having a transfer function to eliminate ripples caused by quantization errors of the position command. The position control unit may also be constructed in such a manner that the feed forward low-pass filter can filter an added output of an output of the feed forward gain multiplication means and an output of the proportional differentiation means. The proportional differentiation means compensates a delay of the speed control system basing on a proportioned differentiation control which controls an output of the feed forward gain multiplication means multiplying an output of the differentiations by a feed forward gain.

BEST MODE FOR IMPLEMENTING THE INVENTION

Figure 1:
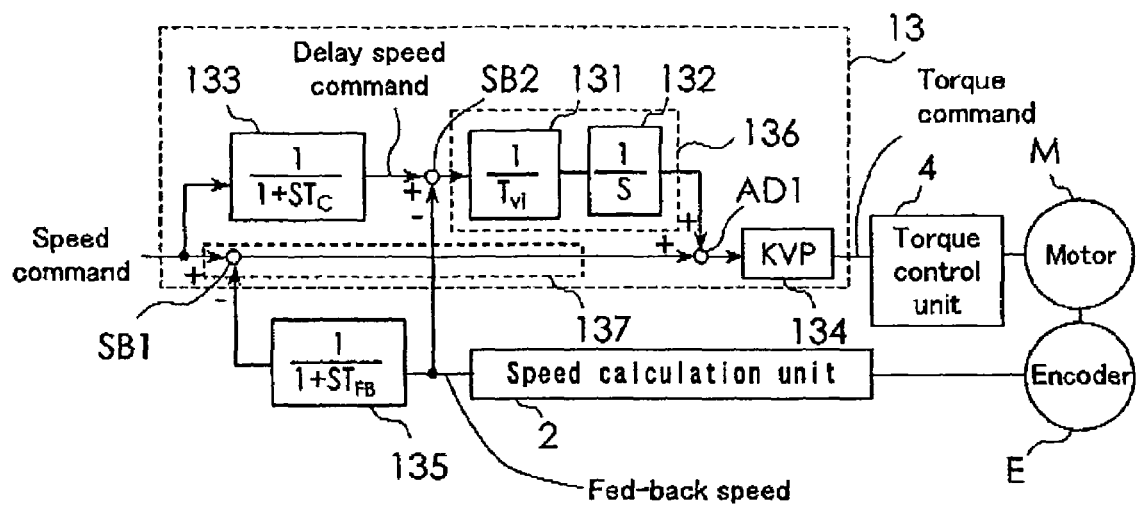
FIG. 1 is a block diagram showing an example configuration of a speed controller used in this invention.
Figure 23:
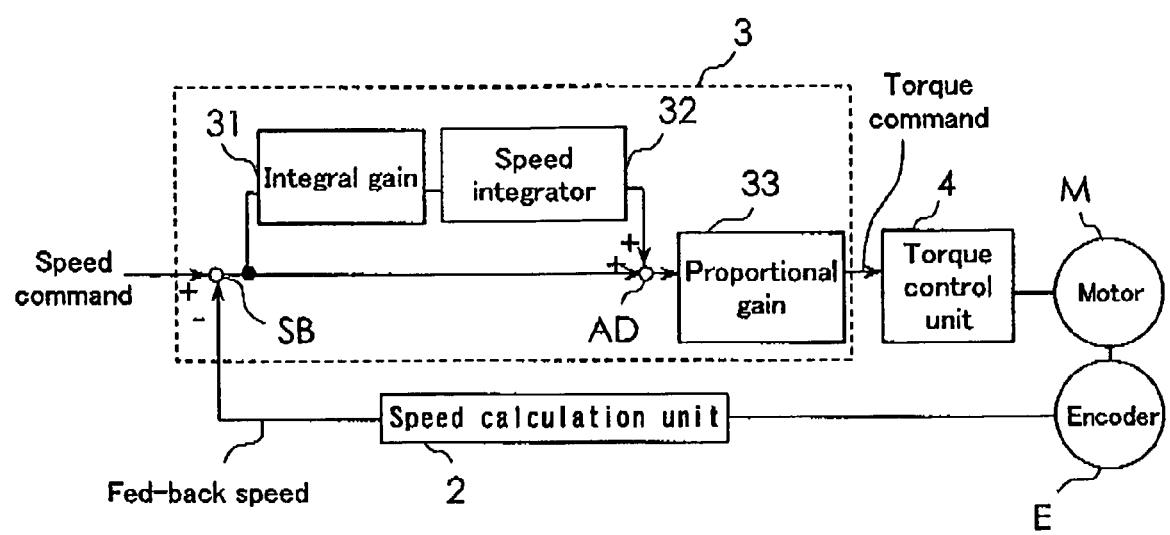
FIG. 23 is a block diagram showing a configuration of a conventional speed controller.

FIG. 1 is a block diagram showing an example configuration of a speed controller used in this invention. The system configuration of FIG. 1 is essentially same as the conventional configuration shown in FIG. 23 except for a different configuration of a speed control unit 13 and a speed feedback low-pass filter 135 applied.

This system has an encoder E as a position detection unit for detecting the position of a motor M which is an object to be controlled. An output of the encoder E is a fed-back position representing the position of the motor output shaft. A speed calculation unit 2 calculates a speed of the motor, basing on the output of the encoder E. The output of the speed calculation unit 2 is a fed-back speed representing the speed of the output shaft of the motor M.

The speed control unit 13 performs a speed control by outputting a torque command basing on a proportional-integral control so that the speed fed back from the speed calculation unit 2 is consistent with the speed indicated by the speed command. As shown in FIG. 1 the speed control unit 13 of this embodiment has a speed integration compensation low-pass filter 133 in the speed control unit which has a transfer function (1/1+STc)) corresponding to a delay of the speed control system. The speed control unit 13 also includes an integral control system 136, made up of a multiplication means 131 and a speed integrator 132, and a proportional control system 137. The multiplication means 131 multiplies an integral gain (1+Tvi) by the speed difference, calculated by a subtraction means SB2, between the fed-back speed and the speed indicated by the delay speed command. The delay speed command is obtained by passing the speed command into the speed integration delay compensation low-pass filter 133. The speed integrator 132 integrates an output of the multiplication means 131. The proportional control system 137 outputs a command proportional to a difference, taken by a subtraction means SB1, between a speed indicated by the speed command and a fed-back speed. The speed control unit 13 further includes a multiplication means 134 which multiplies a sum of an output of the integral control system 136 and an output of the proportional control system 137 by a speed proportional gain KVP to produce a torque command. This is a basic configuration. This example further includes a speed feedback low-pass filter 135 with a transfer function (1/(1+ $ST_{FF}$)) which prevents ripples caused by quantization errors and/or position errors detected by the encoder (position detection unit) from appearing in the torque command. In this case, the proportional control system includes a subtraction means SB1 to calculate a difference between the speed indicated by the speed command and a filtered speed that is obtained by passing the fed-back speed through the speed feedback low-pass filter 135.

In this case, a difference is taken by the subtraction means SB2 between the speed indicated by the speed command passed through the speed integration compensation low-pass filter 133 and the fed-back speed. This difference is multiplied by the speed integration gain (1+Tvi) and passed through the integrator 132. Further, the speed command and the fed-back speed passed through the speed feedback low-pass filter 135. This difference is taken by the subtraction means SB1 and added to the output of the speed integrator 132 by an addition means AD1. In a final step, the sum is multiplied by the speed proportional gain (KVP) to produce a torque command.

The speed feedback low-pass filter 135 is a filter to eliminate ripples caused by the quantization errors and position errors detected by the encoder E. This filter is provided only in the feedback of the proportional control system to prevent ripple components from appearing in the torque command. In the integral control system 136, such a filter is not necessary because the speed integrator 132 performs a smoothing operation.

The speed integration compensation low-pass filter 133 in the speed control unit sets a time corresponding to a delay of the speed control system so that the output of the delay compensation low-pass filter and the speed feedback signal rise almost simultaneously, thereby reducing the residual quantity in the speed integrator 132 when the speed command changes. By constructing the speed control unit 13 as described above, the control of ripples found in the speed feedback signal and the reduction in the residual quantity of the speed integrator 132 when the speed command changes can be accomplished at the same time.

When the quantization errors detected by the encoder E are small, the speed feedback low-pass filter 135 is unnecessary. The transfer function in the delay compensation low-pass filter 133 is not limited to the transfer functions of this embodiment but may be of any type as long as it can simulate or represent a delay of the speed control system.

Figure 2:
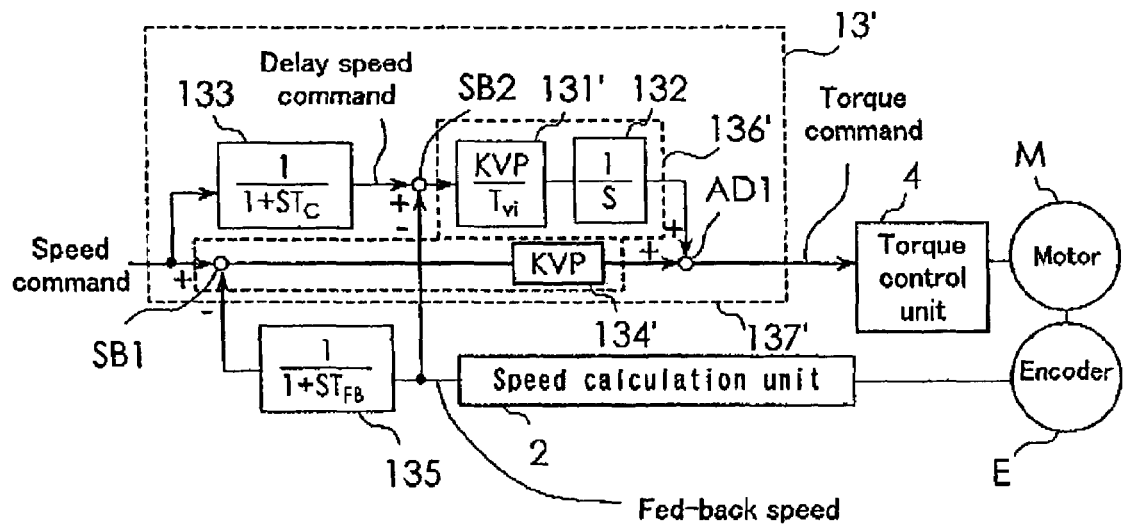
FIG. 2 is a block diagram showing another example configuration of a speed controller used in this invention.

FIG. 2 is a block diagram showing a variation of the speed control unit 13' which is transformed from a speed control unit 13 in the speed controller of FIG. 1. Comparison between the speed control unit 13 of FIG. 1 and the speed control unit 13' of FIG. 2 shows that the construction of the speed control unit 13 differs from that of the speed control unit 13'. The difference is that a multiplication means 134' with a speed proportional gain KVP is arranged inside the proportional control system 137' (it is provided before the addition means AD1), while in the integral control system 136' a transfer function of a multiplication means 131' is changed to multiply a transfer function of the multiplication means 131' by KVP/Tvi in order to multiply an operand by the speed proportional gain KVP. This arrangement can also produce the similar effect to the speed control unit 13 of FIG. 1.

Figure 3:
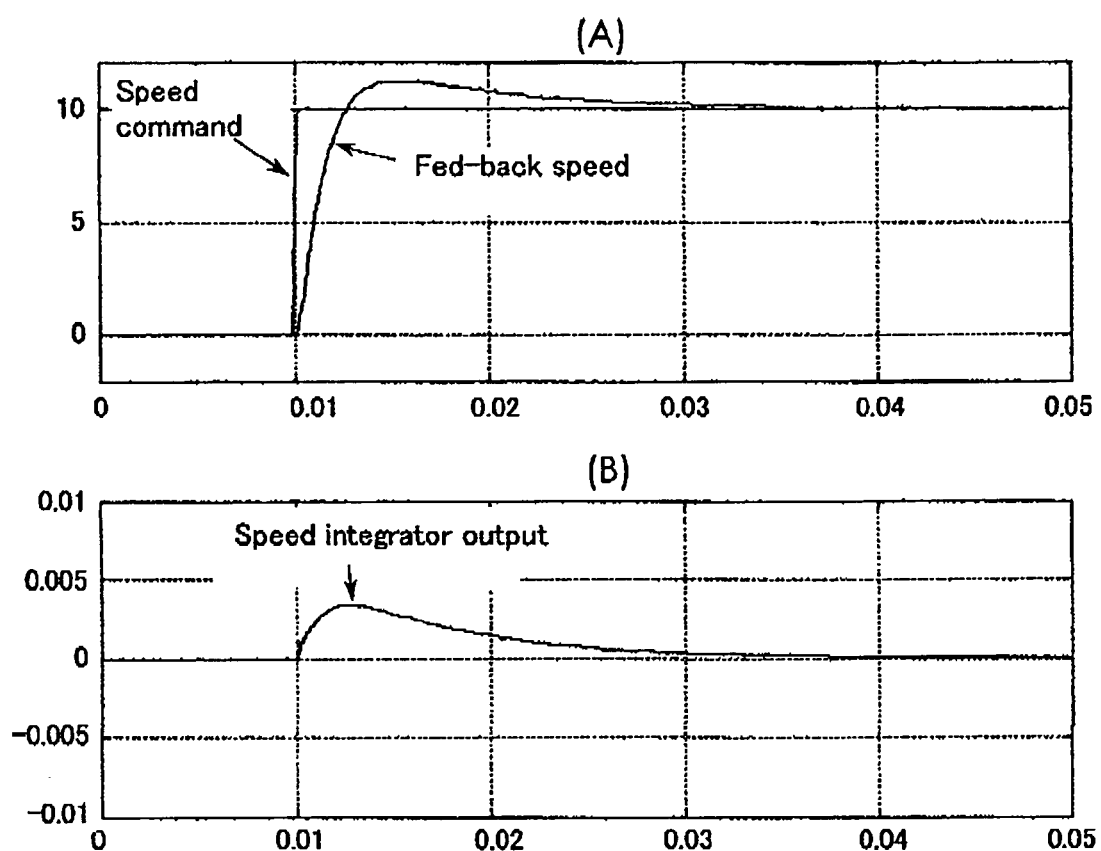
FIG. 3 shows a result of a simulation in which a speed integration compensation low-pass filter is applied.
Figure 4:
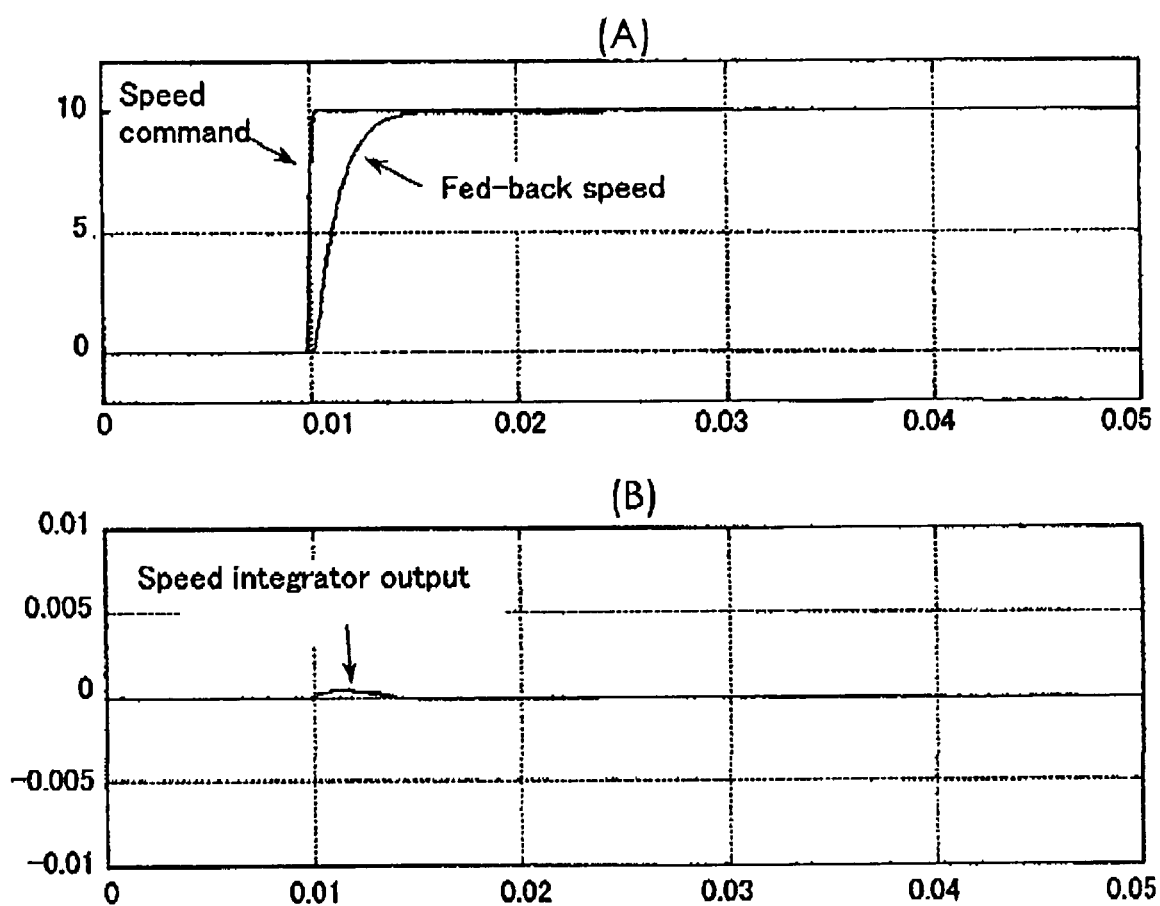
FIG. 4 shows a result of a simulation in which a speed integration compensation low-pass filter is not applied.

FIG. 3 and FIG. 4 show the results of the simulations in which simulates step response in connection with a speed command in the control system shown in FIG. 1. In each of the figures, a vertical axis of an upper figure (A) indicates a speed command and a fed-back speed, and a lower figure (B) indicates an output of a speed integrator. The figures have the same scale in speed, in which a certain speed is standardized to 10 as a reference of the same speed value. The horizontal axes of the figure indicate the time in 0.01 second. FIG. 3 shows a result of a simulation in which a speed integral compensation low-pass filter 133 is not applied. FIG. 4 shows a result of a simulation in which the speed integration compensation low-pass filter 133 is applied. In any of FIG. 3(A) and FIG. 4(A), a speed command is shown as a step-like wave, and a fed-back speed signal is shown as a shape of a wave which rises behind the speed command. In any of FIG. 3(A) and FIG. 4(A), the fed-back speed signal rises ⅓ to ½ of 0.01 second behind a rising position of the speed command in a step-like shape. These delays indicate a delay of a time response in a speed control system. When the speed integration compensation low-pass filter 133 is not applied, an output of a speed integrator 132 shows a small peak in an area where the fed-back speed signal rises as shown in FIG. 3(B). In this area, there is a difference between a speed indicated by the speed command and the fed-back speed signal. The peak shows that an integration of a speed difference is accumulated. In other words, the small peak of the output of the speed integrator, at a time while the fed-back speed signal is rising, indicates the residual quantity of the remaining speed difference while the fed-back speed signal is rising. As shown in FIG. 3(A), the fed-back speed signal overshoots to a value of around 12 due to the residual quantity. In a time area where an output of the speed integrator converges to 0, an overshoot of the fed-back speed signal converges to a speed command value of 10, as shown in FIG. 3. As being seen that the residual quantity of the speed integrator 132 increases at a point where the fed-back speed signal rises, the residual quantity of the speed integrator 132 changes as accelerating or decelerating a motor.

FIG. 4 shows a result of a simulation, when the speed integration compensation low-pass filter 133 is applied to the speed controller. In this case, the speed command in a step-like shape as shown in FIG. 4(A) passes through the speed integration compensation low-pass filter 133, and then is output as a delay speed command. A rise of the delay speed command is so adjusted to have a delay almost same to that of a rise of the fed-back speed signal as shown in FIG. 4(A). As described above, a difference between a speed indicated by the delay speed command and the fed-back speed signal is produced by the subtraction means SB2, multiplied 1/Tvi times by the multiplication means 131, and integrated by the speed integrator 132. 3 In this case, the difference of a speed indicated by the delay speed command and a fed-back speed signal produced by the subtraction means SB2 is considerably small in the area where the speed command and the fed-back speed signal are rising. As shown in FIG. 4(B), the residual quantity of the speed difference in the speed integrator 132 shows a small peak in that area, and keeps a regular value which is almost 0 after the residual quantity of the speed difference leaves that area. A height of the small peak of the residual quantity of the speed integrator 132 of FIG. 4 (B) is so small, compared to that of FIG. 3(B), that it can be almost ignored. As shown in FIG. 4(A), the fed-back speed signal does not overshoot to the speed command of over 10, but rapidly converges to the same value of 10 as a value of the speed command.

As described above, a controller of the invention can reduce the residual quantity of the speed integrator 132 to almost 0 while a motor is rotating. Accordingly, a integral gain can be increased to improve the ability of suppressing disturbance. The speed feedback low-pass filter 135 can be composed of a low-pass filter which damps exponentially depending on time as shown in the embodiment of the invention. Also the speed feedback low-pass filter 135 can be composed of transfer functions in types of general functions in such a manner to simulate a measured value or a theoretical value of responding characteristics of a speed.

Figure 5:
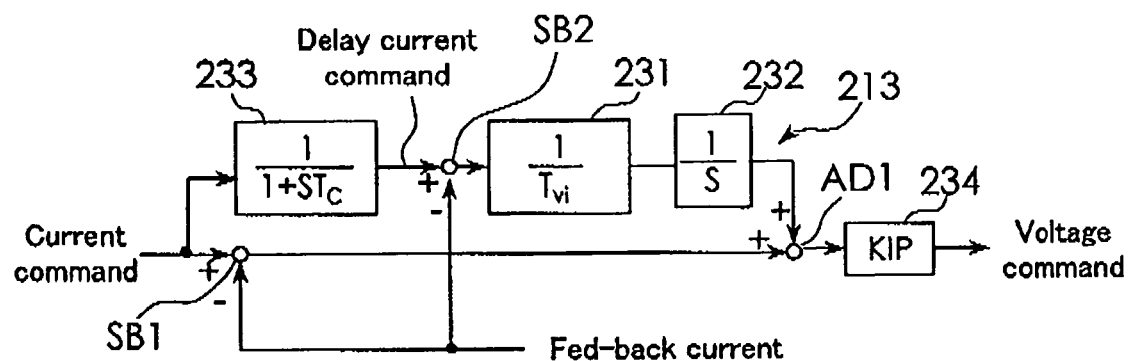
FIG. 5 is a block diagram showing an example configuration of a current controller used in another embodiment of this invention.

FIG. 5 is a block diagram of an example configuration of a current control unit 213 which is to be used as a substitute of a conventional control unit of a current control unit 4a or a current control unit 4b.

As shown in FIG. 5, a current controller 213 of this embodiment includes a delay compensation low-pass filter 233 in a current control unit having a transfer function (1/(1+STc)) corresponding to a delay of a current control system. The current controller 213 further includes an integral control system including a multiplication means 231 and a current integrator 232 for integrating an output of a multiplication means 231, and a proportional control system. The multiplication means 231 multiplies an integral gain (1/Tvi) by a current difference between a current indicated by a delay current command and a motor current (a fed-back current) by a subtraction means SB2. The delay current command is obtained by inputting a current command to a delay compensation low-pass filter 233 in the current control unit. The integral control system has a current integrator 232 for integrating an output of a multiplication means 231. The proportional control system outputs a command proportional to a current difference between a current indicated by the current command and a fed-back current. Furthermore, the current controller 213 includes a multiplication means 234 for outputting a voltage command. The voltage command is obtained by multiplying a current proportional gain KIP by an added vale of an output of the integral control system and an output of the proportional control system by an addition means AD1. In this embodiment, a current difference between a current indicated by the delay current command and a fed-back current is taken by the subtraction means SB2, and an output of the current integrator 232 is added to an output of the proportional control system by the addition means AD1. The output of the addition means AD1 is multiplied a current proportional gain KIP by the multiplication means 234 to produce a voltage command.

A transfer function is set corresponding to a delay of the current control system in the delay compensation low-pass filter 233 in the current control unit so that a delay current command and a fed-back speed signal rise almost simultaneously. Then the residual quantity of the current integrator 232 can be reduced when the current command changes. By constructing the current control unit 213 as described above, a suppression of ripples included in the fed-back current and a decrease of the residual quantity in the current integrator 232 when the current command changes can be achieved at the same time.

Any transfer function simulating a delay of the current control system can be employed for the delay compensation low-pass filter 233 in the current control unit, and is not limited to the transfer functions in the type used in this embodiment. When a delay of the control system is large, delay of one or more samples of a delay can be combined with the low pass filter.

Figure 6:
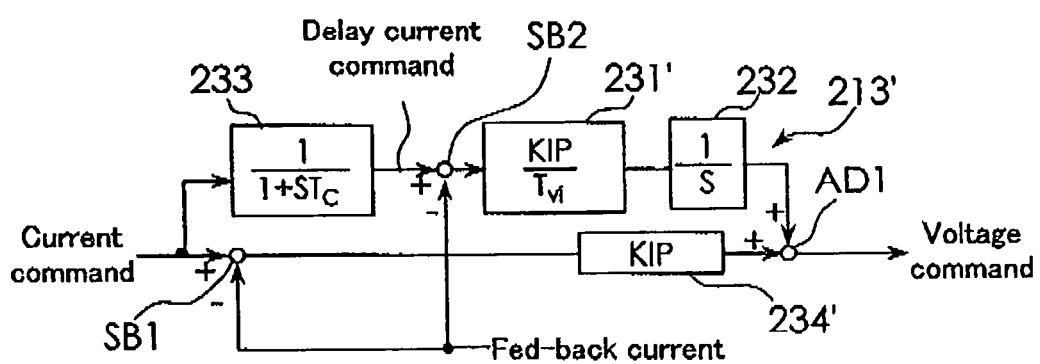
FIG. 6 is a block diagram showing an example configuration of another current controller used in this invention.
Figure 7:
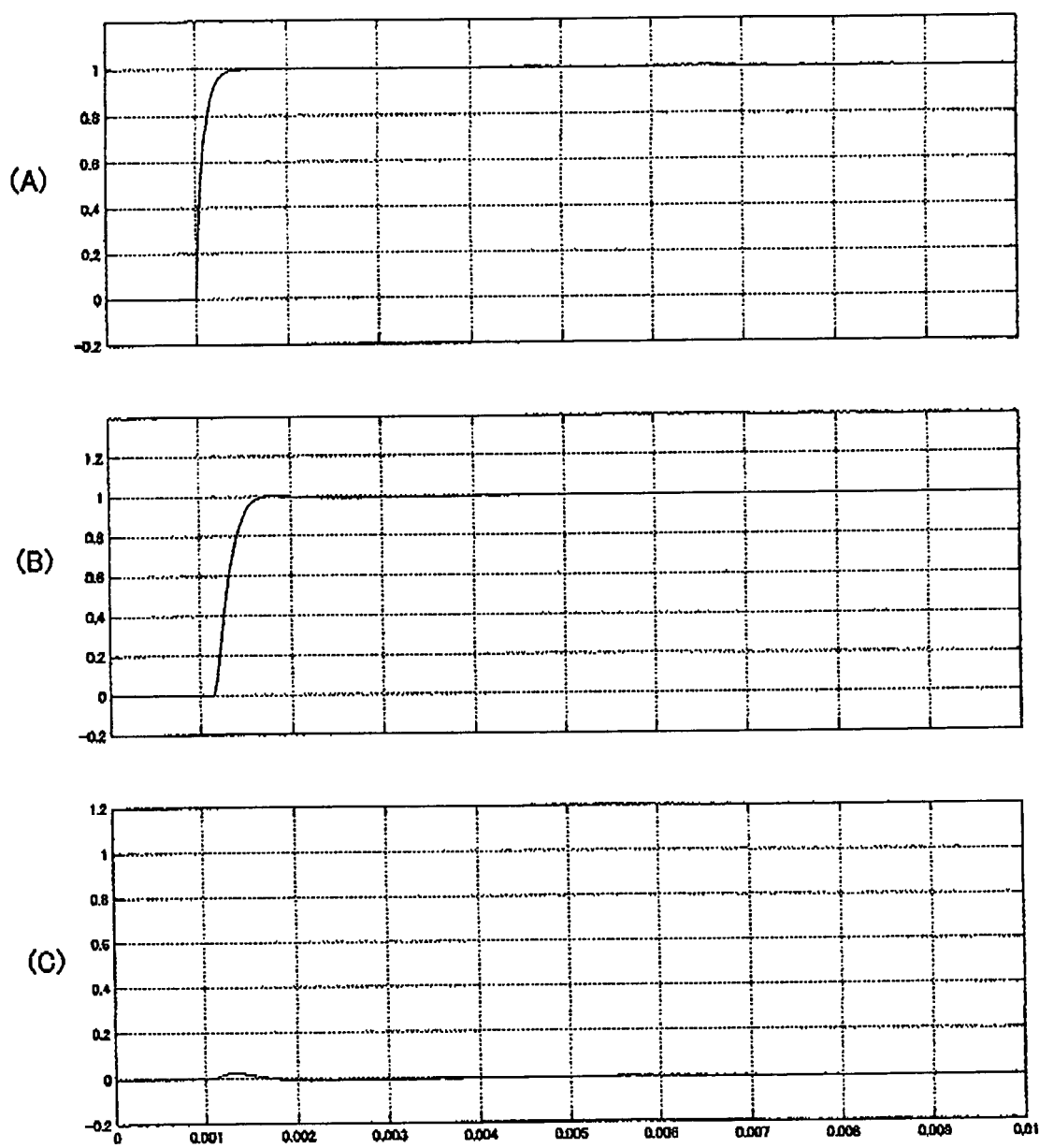
FIG. 7(A) to (c) show a result of a simulation of motor operating waves in which a delay compensation low-pass filter in a current control unit is applied.
Figure 8:
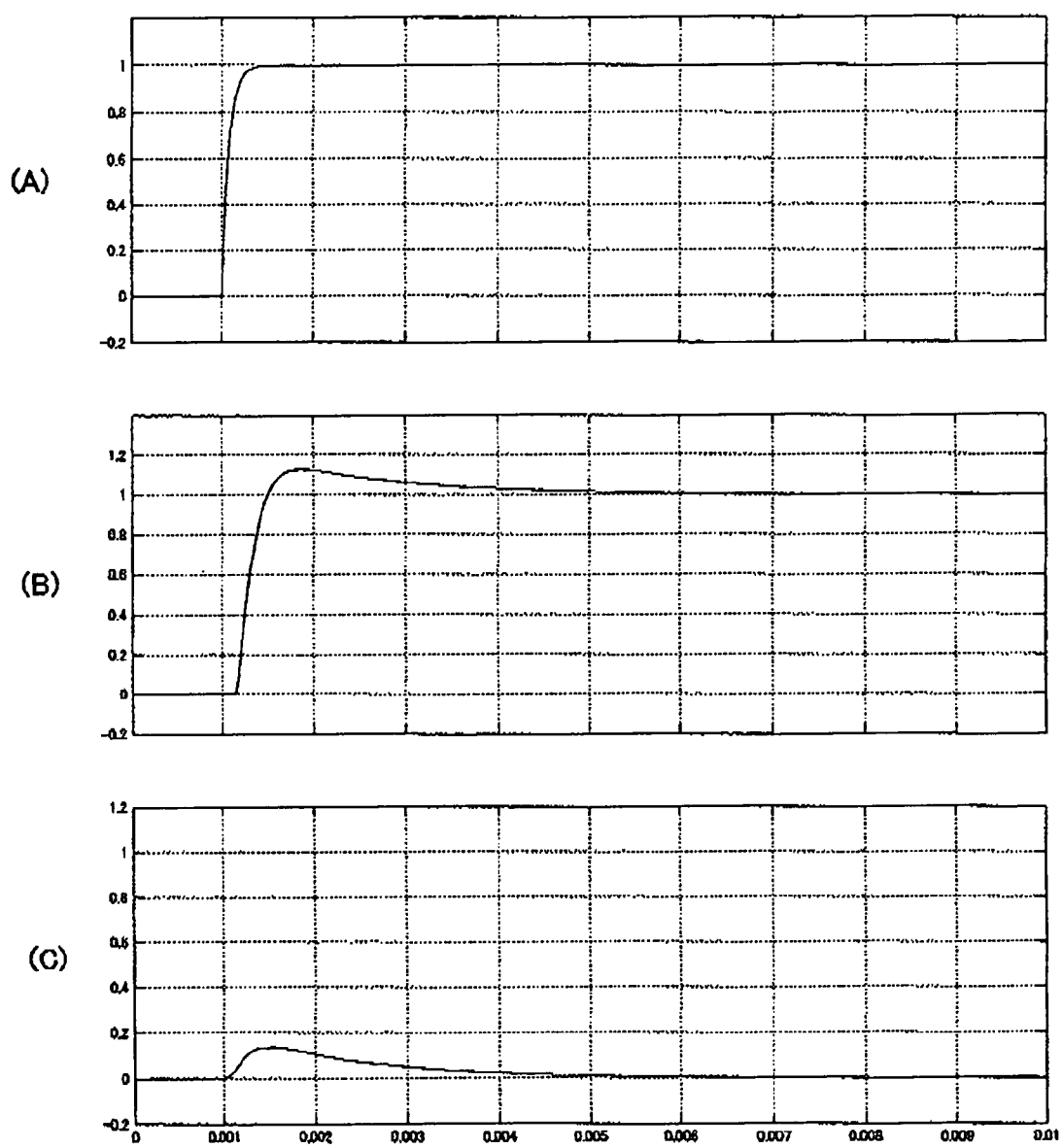
FIG. 8(A) to (c) show a result of a simulation of motor operating waves in which a delay compensation low-pass filter in a current control unit is not applied.

FIG. 6 is a block diagram showing an example of modification of the current control unit. Comparison between the current control unit 213 of FIG. 5 and the current control unit 213' of FIG. 6 shows that the construction of the current control unit 213 differs from that of the current control unit 213'. The difference is that a multiplication means 234' with a current proportional gain KIP is arranged inside the proportional control system (it is provided before the addition means AD1), while in the integral control system a transfer function of a multiplication means 231' is changed to in order to multiply an operand by the speed proportional gain KIP. This arrangement can also produce the similar effect to the current control unit 213 of FIG. 5.

FIG. 7(A) to (C) and FIG. 8(A) to (C) show the results of simulations of a current response in this control system, and each of them show a current command, a fed-back current signal and an output of the integrator. The figures have the same scale in current, in which a certain current value is standardized to 1 as a reference. The horizontal axes are in 0.001 milli second. In any of FIG. 7 and FIG. 8, a speed command is shown as a step-like wave, and a fed-back speed signal is shown as a shape of a wave which rises behind the speed command. In any of FIG. 7(A) and FIG. 8(A), the fed-back current signal rises about ⅕ of 0.001 milli second behind the current command rising. As shown in FIG. 7 a delay compensation low-pass filter 233 in the current control unit is applied, a rise of an output current of the current integrator 232 delays as much as that of a fed-back current. The difference of the output current and the fed-back current is canceled by the addition means AD1. Thus an output of the integrator shows a small peak when a fed-back current is rising, or otherwise keeps a regular value which is almost 0. In this case, a height of an output of the integrator is so small that it can be almost ignored. When the delay compensation low-pass filter 233 in the current control unit is not applied, however, a fed-back current and an output of the current integrator 232 do not cancel with each other sufficiently by the addition measure AD1 when a fed-back current is rising as shown in FIG. 8. Therefore the peak shown by an output of the current integrator, at a point where a fed-back current has risen, is higher compared to when the delay compensation low-pass filter 233 is applied.

As a result, when the delay compensation low-pass filter 233 in the current control unit is not applied, a current overshoots greatly. When the delay compensation low-pass filter 233 in the current control unit is applied, however, a current can overshoot less by reducing the residual quantity of the current integrator 232 to 0 while a motor is rotating.

Figure 24:
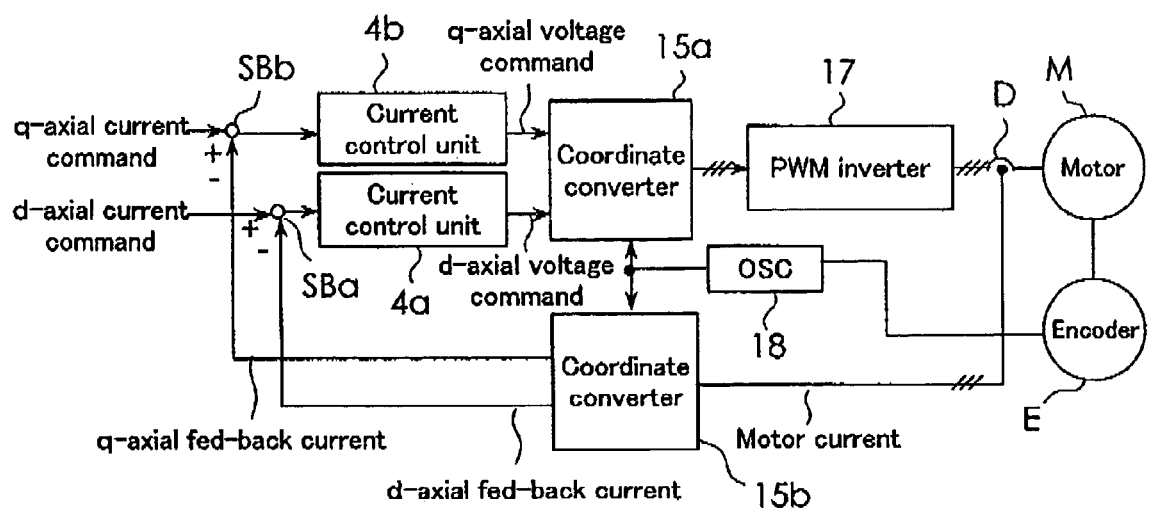
FIG. 24 is a block diagram showing a configuration of a conventional current controller of a motor.
Figure 25:
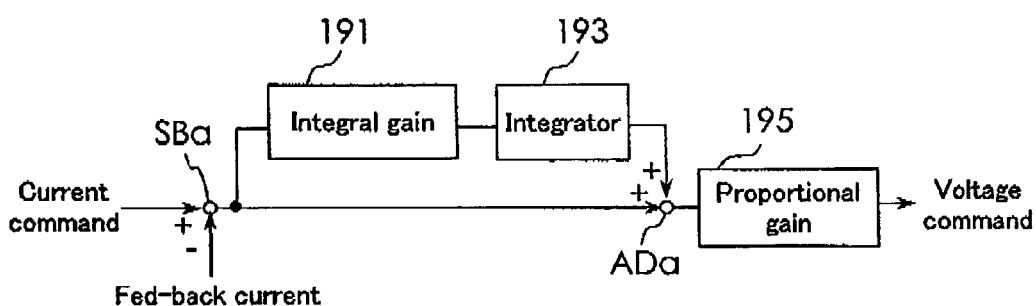
FIG. 25 shows a configuration of a conventional current controller.
Figure 26:
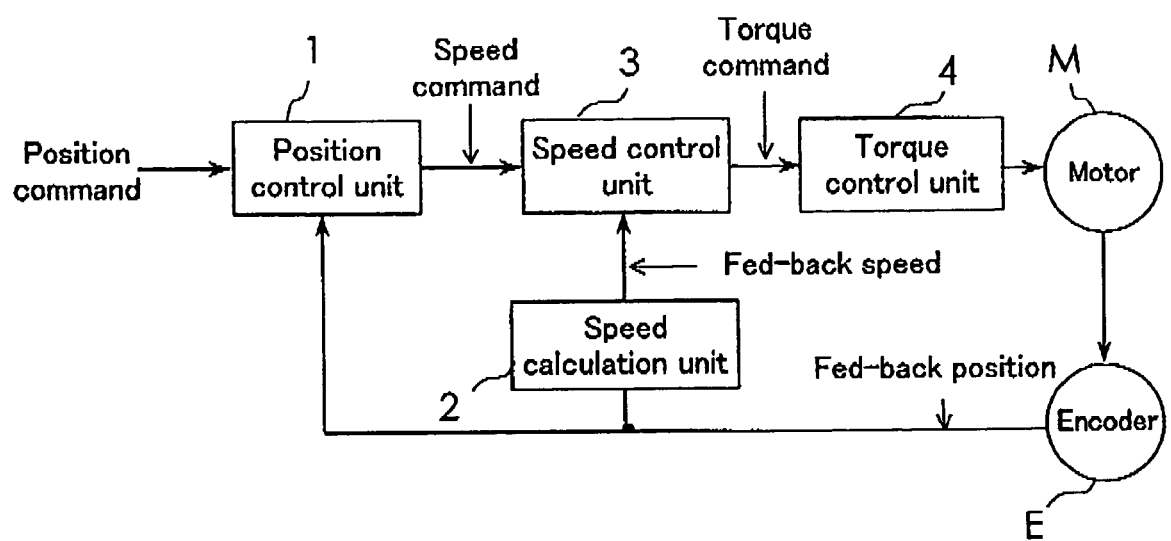
FIG. 26 shows a configuration of a conventional position controller of a motor.
Figure 27:
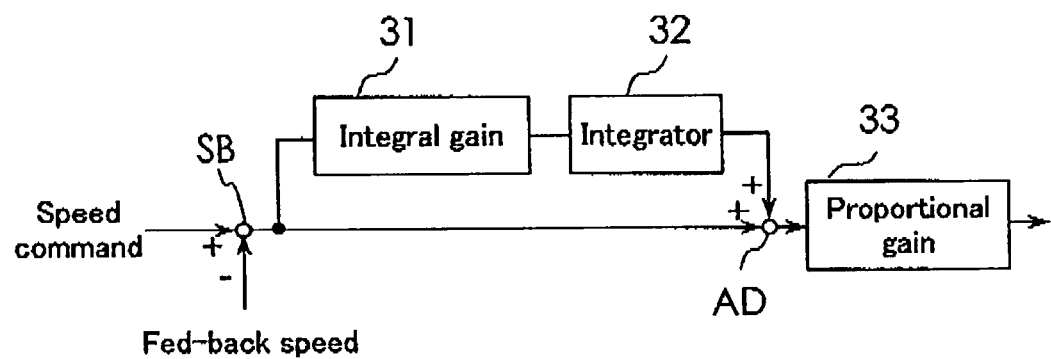
FIG. 27 is a block diagram showing a configuration of a conventional speed control unit.

This invention is, of course, applicable for a control of a direct-current motor. In that case, a d-g axis current control system, as shown in FIG. 24, and a coordinate converter are not required.

Figure 9:
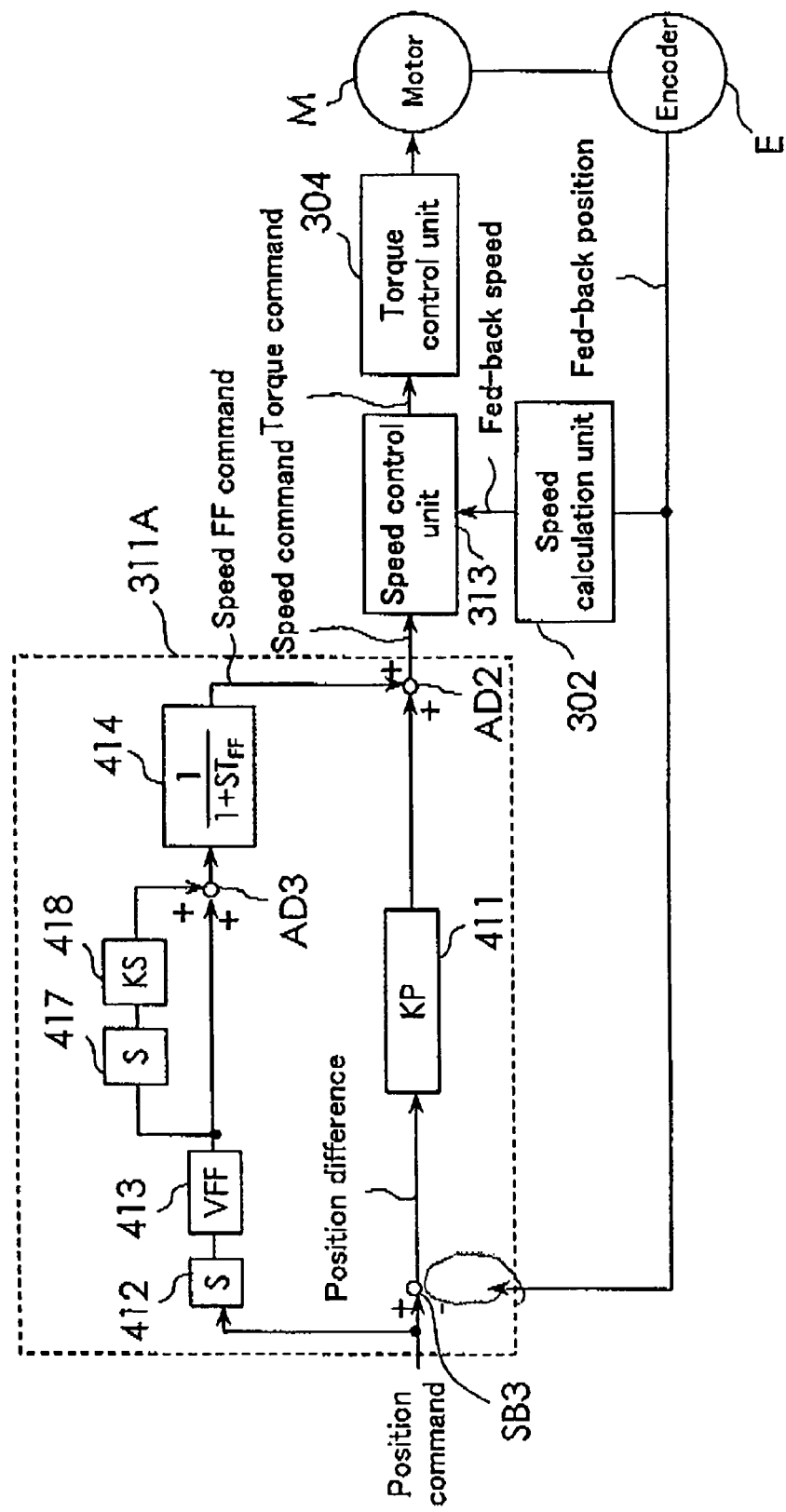
FIG. 9 is a block diagram showing a configuration of a motor position controller in an embodiment of this invention.

FIG. 9 is a block diagram showing a configuration of this embodiment which was employed in a motor position control system of this invention. This system has an encoder E as a position detection unit for detecting the position of a motor M which is an object to be controlled. An output of the encoder E is a fed-back position representing the position of a motor output shaft. A speed calculation unit 302 calculates a speed of a motor, basing on the output of the encoder E and the output of the speed calculation unit 302 is a fed-back speed representing the speed of the output shaft of the motor M. The position control unit 311A performs a position control by outputting a speed command so that a position of the motor M fed back from an encoder E, which is the position detection unit, is consistent with a position indicated by a position command. In this embodiment, the position control unit 311A includes a differentiator 412, a feed forward gain multiplication means 413, a differentiator 417, a multiplier 418, an addition means AD3, a feed forward low-pass filter 414. The differentiator 412 differentiates a position command. The feed forward gain multiplication means 413 multiplies an output of the differentiator 412 by a feed forward gain VFF. The differentiator 417 further differentiates an output of the multiplication means 413. The multiplier 418 multiplies an output of the differentiator 417 by a differential gain (Ks). The addition means AD3 adds an output of the multiplier 418 and an output of the feed forward gain multiplication means 413. The feed forward low-pass filter 414 has a transfer function $(1/(1+ST_{FF}))$ for removing ripples caused by quantization errors in a position command. In this embodiment, a proportional differential means is constructed by the differentiator 417 and the multiplier 418 to compensate a delay of the speed control unit. Generally a feed forward gain VFF is set to around 40 to 60% (0.4 to 0.6). A difference between a position indicated by a position command and a fed-back position can be obtained by a subtraction means SB3. This difference is multiplied by a position proportional gain KP by a position loop multiplication means 411.

An added command of the two commands by an addition means AD2 is output as a speed command from the position control unit 311A. One of the two commands is a command output from a position loop multiplication means 411. And the other is a speed feed forward command (a speed FF command) output from the feed forward low-pass filter 414. By performing a proportional difference control for an output of the feed forward multiplication, a primary advance is characterized to compensate a delay of the speed control unit, which improves the followability to a position command. Furthermore, the use of a feed forward low-pass filter 414 prevents ripples caused by quantization errors involved in the position command from being involved in the speed command itself.

A speed command becomes a torque command after passing through the speed control unit 313. A torque control unit 304 controls a current so as to output a torque as required by the torque command. By adding the feed forward, a positioning time can be decreased by the controller of this embodiment than that by a conventional controller.

Figure 10:
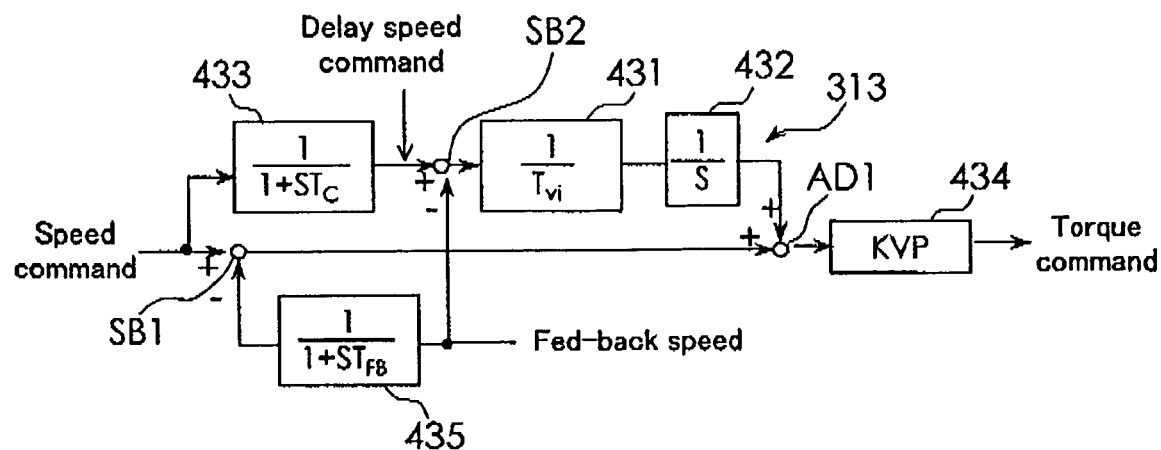
FIG. 10 is a block diagram showing an example configuration of a speed control unit used in this invention.

FIG. 10 is a block diagram showing an example of a speed control unit 313 in FIG. 9 used in this invention. The speed control unit 313 performs a speed control, basing on a proportional-integral control by outputting a torque command so that the speed fed back from the speed calculation unit 302 is consistent with the speed indicated by the speed command. As shown in FIG. 10, the speed controller 313 of this embodiment includes a delay compensation low-pass filter 433 in a speed control unit 433 having a transfer function (1/(1+STc)) corresponding to a delay of a speed control system. The speed controller 313 further includes an integral control system including a multiplication means 431 and a current integration 432 for integrating an output of a multiplication means 431, and a proportional control system. The multiplication means 431 multiplies an integral gain (1/Tvi) by a speed difference between a speed indicated by a delay speed command and a fed-back speed by a subtraction means SB2. The delay speed command is obtained by inputting a speed command to a delay compensation low-pass filter 433 in the speed control unit. The proportional control system outputs a command proportional to a speed difference between a speed indicated by the speed command and a fed-back speed. Furthermore, the speed controller 313 includes a multiplication means 434 for outputting a torque command. The torque command is obtained by multiplying a speed proportional gain KVP by an added vale of an output of the integral control system and an output of the proportional control system by an addition means AD1. The above construction is a basic structure. This example further includes a speed feedback low-pass filter 435 with a transfer function (1/(1+ST$_{FF}$)) which prevents ripples caused by quantization errors and/or position errors from the encoder (position detection unit) from appearing in the torque command. In this case, the proportional control system includes a subtraction means SB1 to calculate a difference between the speed indicated by the speed command and a filtered speed that is obtained by inputting the fed-back speed into the speed feedback low-pass filter 435.

In this case, a difference is taken by the subtraction means SB2 between the fed-back speed and the speed indicated by the delay speed command passed through the delay compensation low-pass filter 433 in the speed control system. This difference is multiplied by the speed integration gain (1/Tvi) and passed through the integrator 432. Further, the difference between the speed indicated by the speed command and the fed-back speed passed through the speed feedback low-pass filter 435 is taken by th subtraction means SB2. This difference is added to the output of the speed integrator 432 by an addition means AD1. In a final step, the output is multiplied by the speed proportional gain (KVP) to produce a torque command.

The speed feedback low-pass filter 435 is a filter to eliminate ripples caused by the quantization errors and/or position errors from the encoder E. This filter is provided only in the feedback of the proportional control system to prevent ripples from appearing in the torque command. In the integral control system, such a filter is not necessary because the speed integrator 432 performs a smoothing operation.

The delay compensation low-pass filter 433 in the speed control unit sets a time corresponding to a delay of the speed control system so that the output of the delay compensation low-pass filter and the fed-back speed signal rise almost simultaneously, thereby reducing the residual quantity in the speed integrator 432 when the speed command changes. By constructing the speed control unit 313 as described above, the suppression of ripples found in the fed-back speed signal and the reduction in the residual quantity of the speed integrator 432 when the speed command changes can be accomplished at the same time.

When the quantization errors from the encoder E are small, the speed feedback low-pass filter 435 is not required. The transfer function in the delay compensation low-pass filter 433 is not limited to the transfer function of this embodiment but may be of any type as long as it can simulate or represent a delay of the speed control system.

Figure 11:
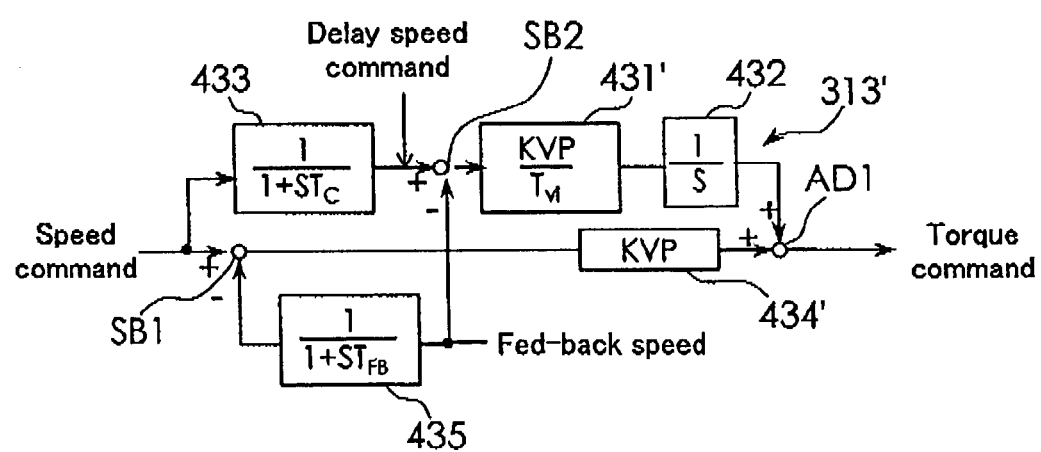
FIG. 11 is a block diagram showing an example configuration of another speed control unit used in this invention.

FIG. 11 is a block diagram showing the speed control unit 313' which is an example of a variation. Comparison between the speed control unit 313 of FIG. 10 and the speed control unit 313' of FIG. 11 shows that the construction of the speed control unit 313 differs from that of the speed control unit 313'. The differences are that a multiplication means 434' with a speed proportional gain KVP is arranged inside the proportional control system (it is provided before the addition means AD1), and that a transfer function of a multiplication means 431' is changed in order to multiply an operand by the speed proportional gain KVP in the integral control system. This arrangement can also produce the similar effect to the speed control elements 313 of FIG. 10.

Figure 12:
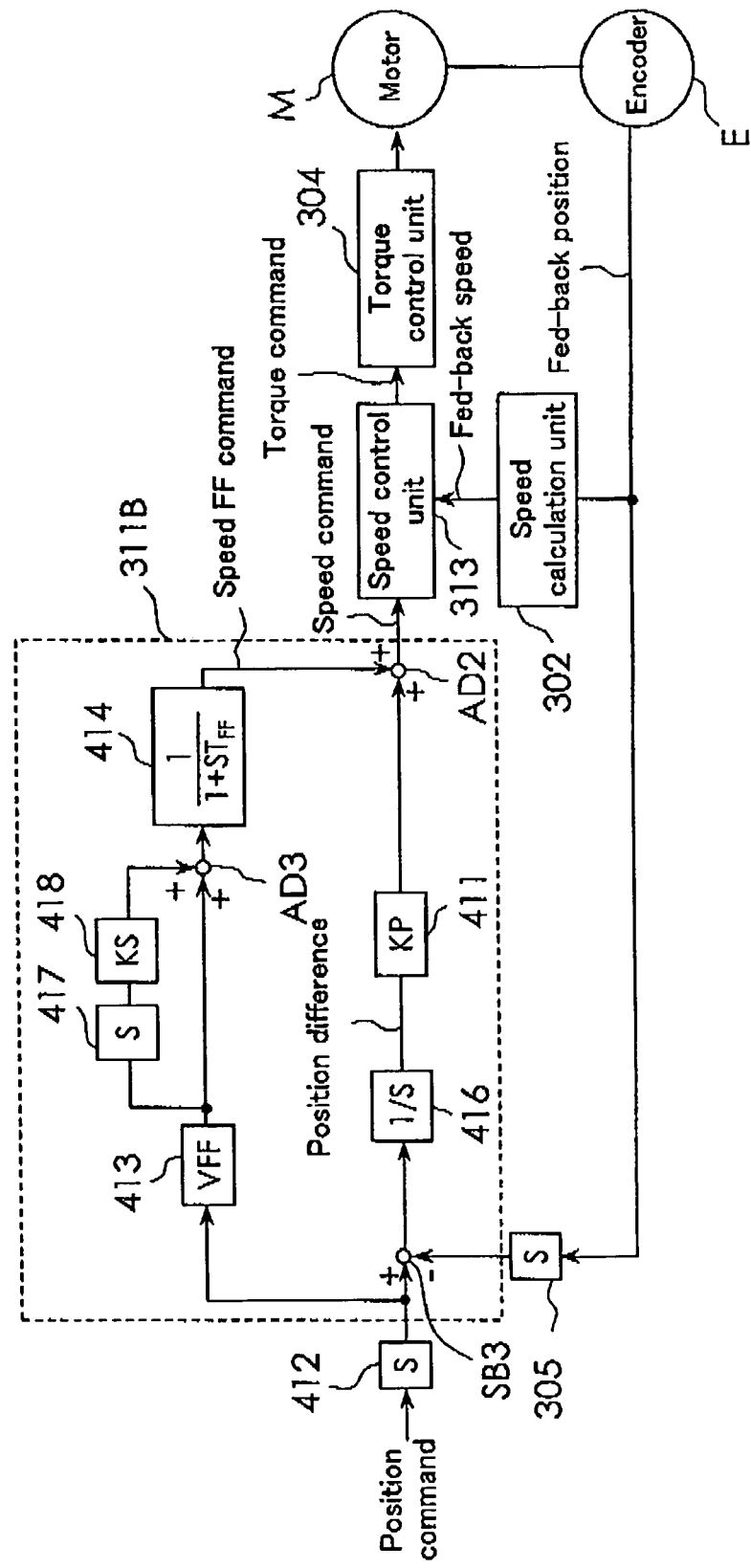
FIG. 12 is a block diagram showing a configuration of a motor position controller in another embodiment of this invention.

FIG. 12 is a block diagram showing a variation of the embodiment in FIG. 9. A configuration of the position control unit 311B in the embodiment of FIG. 12 is different from that of FIG. 9. The same elements in the embodiment of FIG. 12 as that of FIG. 9 are applied the same reference numerals as those of FIG. 9 to omit explanations. Compared the embodiment of FIG. 9 to the embodiment of FIG. 12, there are following differences between them. The differences are the position of a differentiator 412, and that an integrator 416 and a differentiator 305 are added to the embodiment of FIG. 12. In other words, in the position controller 311B, the differentiator 412 is applied before the subtraction means SB3, the differentiator 305 is applied before the subtraction means SB3, the integrator 416 is applied before a position loop multiplication means 411. The differentiator 412 differentiates a position command. The differentiator 305 differentiates a position detected by the position detector. The integrator 416 integrates a difference (position difference) between an output of the differentiator 412 (difference of a fed-back position command) and an output of the differentiator 305 (difference of a fed-back position). This arrangement can also produce the similar effect to the embodiment of FIG. 9.

Figure 13:
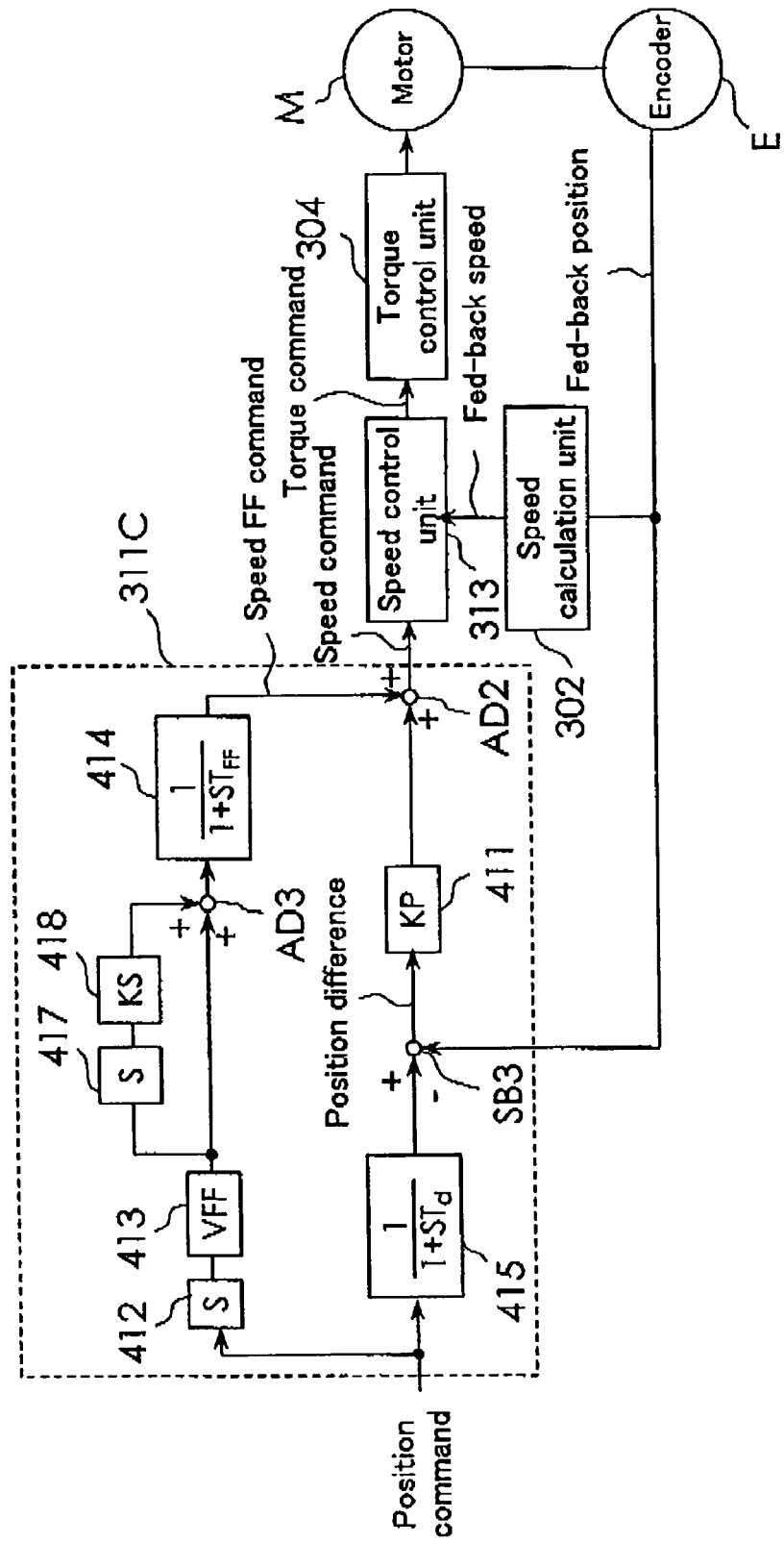
FIG. 13 is a block diagram showing a configuration of a motor position controller in still another embodiment of this invention.

FIG. 13 is a block diagram showing a configuration of a motor position controller in still another embodiment of this invention. The same elements in the embodiment of FIG. 13 as that of FIG. 9 are applied the same reference numerals as those of FIG. 9 to omit explanations. In this embodiment, in addition to the configuration in the embodiment of FIG. 9, the position control unit 311C further includes a delay compensation low-pass filter 415 in the position control unit. The delay compensation low-pass filter 415 has a transfer function (1/(1+STd)) corresponding to a delay of a speed control system. In this embodiment, a position difference between a position indicated by a position command passed through a delay compensation low-pass filter in the position control unit 415 and a fed-back position is obtained by the subtraction means SB3. And the position difference is input to the position loop multiplication means 411. In this example, a feed forward gain VFF is set to 1 or close to 1.

A delay of the speed control system is set as a transfer function for the delay compensation low-pass filter 415 in the position control system. The transfer function of the delay compensation low-pass filter 415 in the position control system is so set that an output of the delay compensation low-pass filter 415 in the position control system and a fed-back position signal rises almost simultaneously. When the delay compensation low-pass filter 415 in the position control system is added, an output of the position loop multiplication means 411 in the position control unit 311C is considerably small value. In this controller, a feed forward gain VFF can be increased to 100% or close to 100% (value of 1 or close to 1) by adding the delay compensation low-pass filter 415 in the position control system. A positioning setting time can be decreased as much as that of the embodiment in FIG. 9, or some more decreased.

Figure 14:
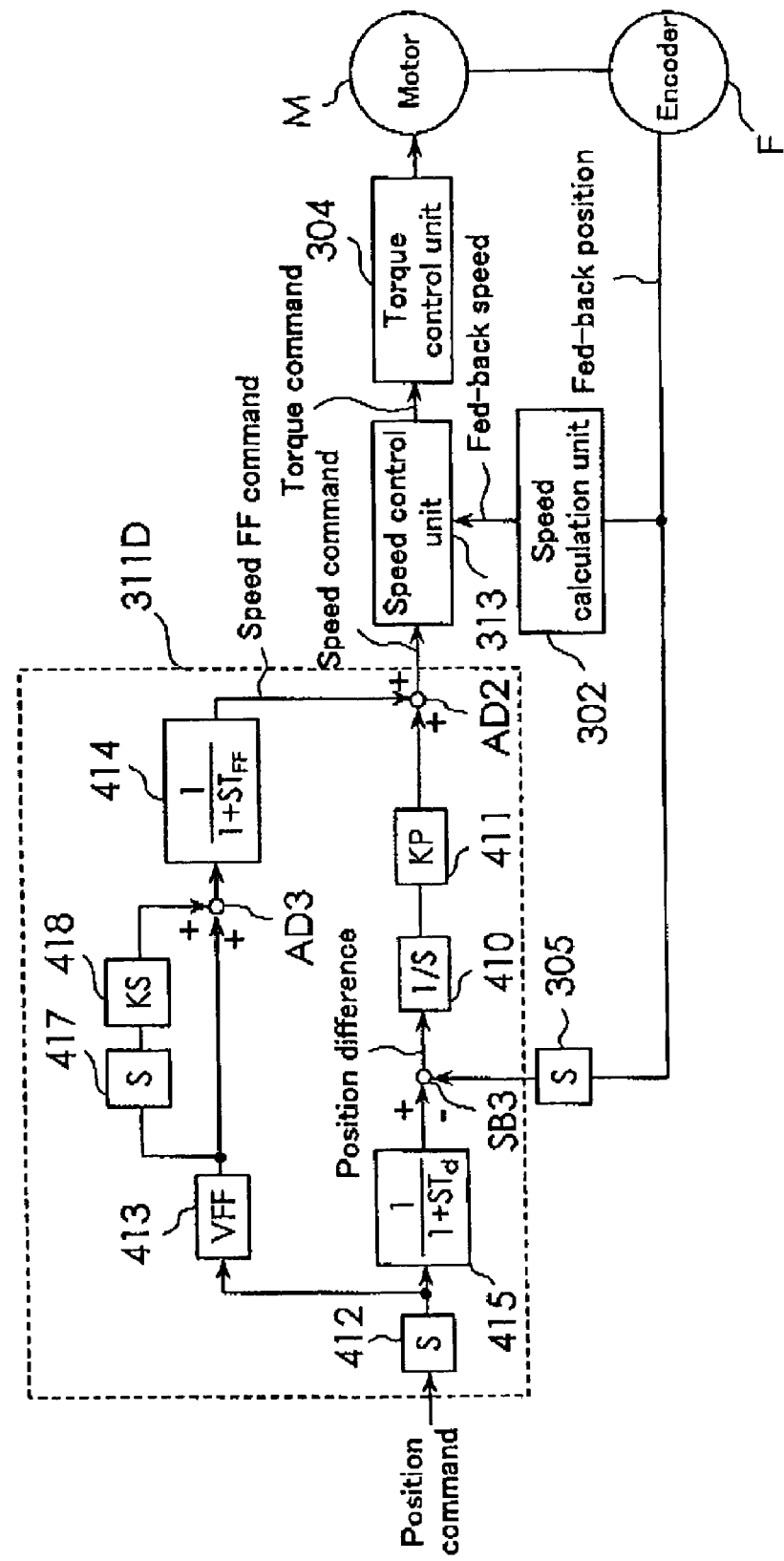
FIG. 14 is a block diagram showing a configuration of a motor position controller in yet another embodiment of this invention.

FIG. 14 shows a configuration when the delay compensation low-pass filter 415 in the position control system is added in the embodiment of FIG. 12. Since the embodiment of FIG. 14 has the same configuration to that of FIG. 12 except the delay compensation low-pass filter 415 in the position control system, an explanation is omitted.

Figure 15:
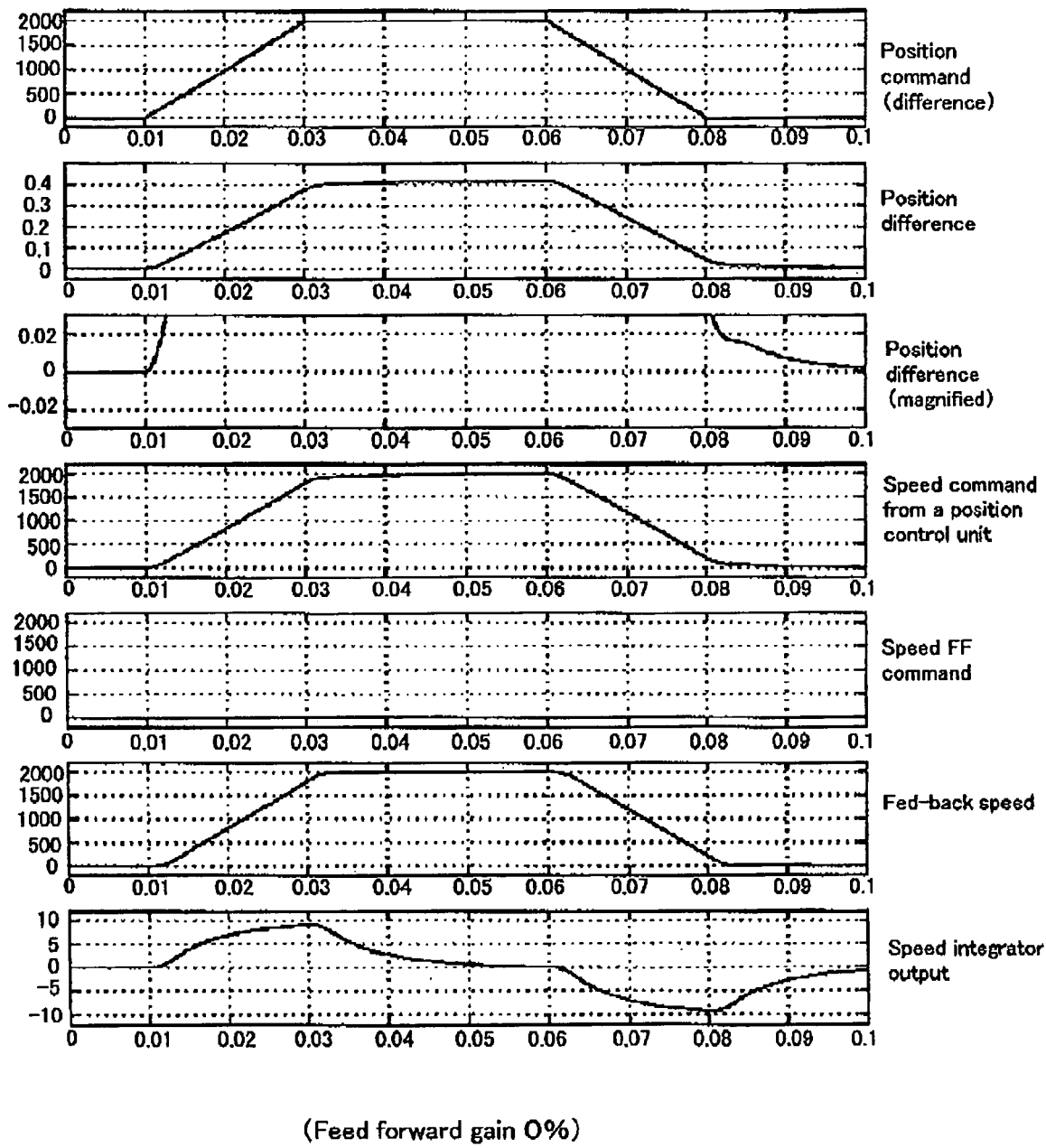
FIG. 15 shows a result of a simulation of a position controlling operation when a feed forward gain is set to 0% in a conventional position controller.
Figure 16:
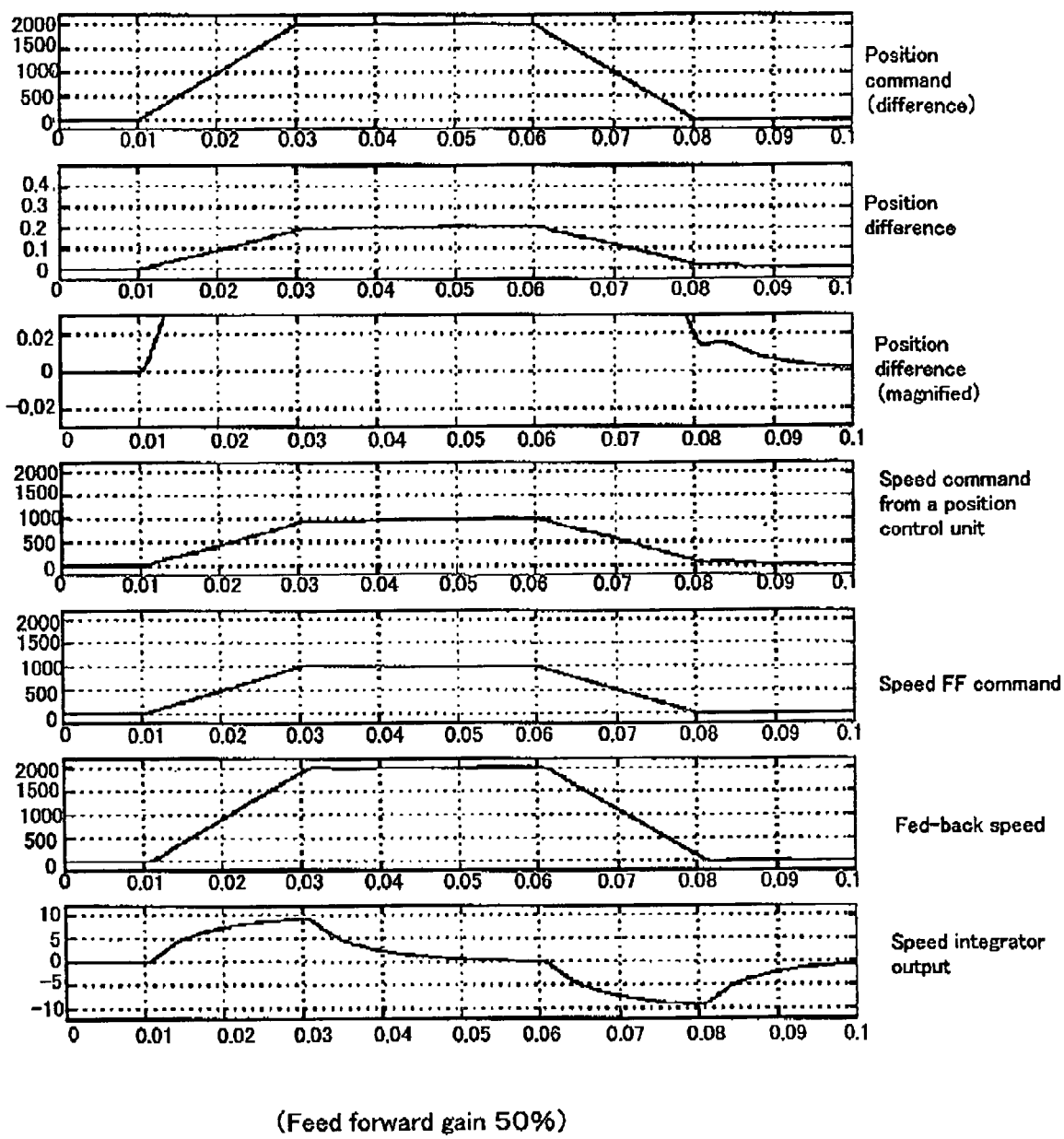
FIG. 16 shows a result of a simulation of a position controlling operation when a feed forward gain is set to 50% in the conventional position controller.
Figure 17:
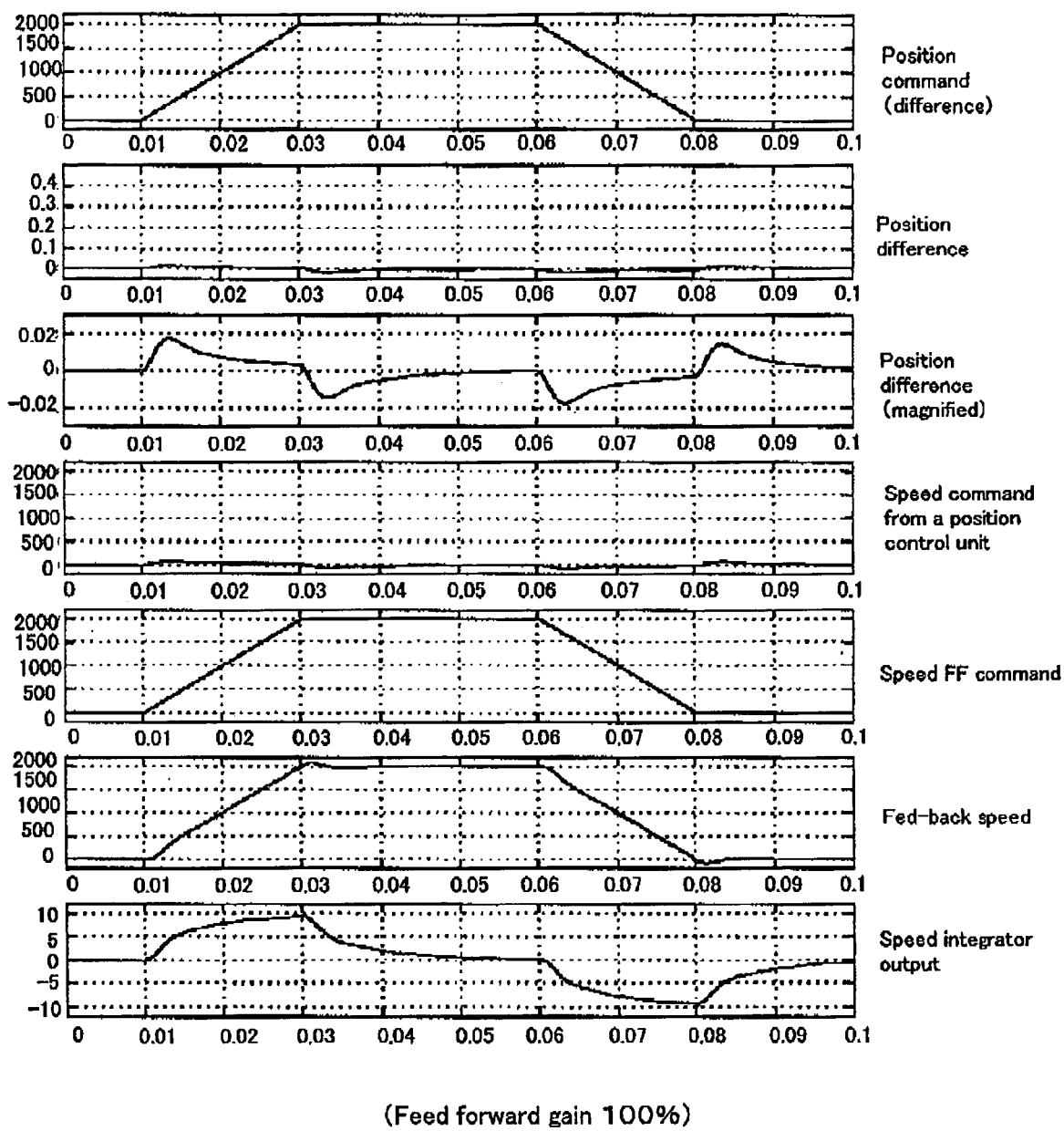
FIG. 17 shows a result of a simulation of a positioning controlling operation when a feed forward gain is set to 100% in the conventional position controller.
Figure 18:
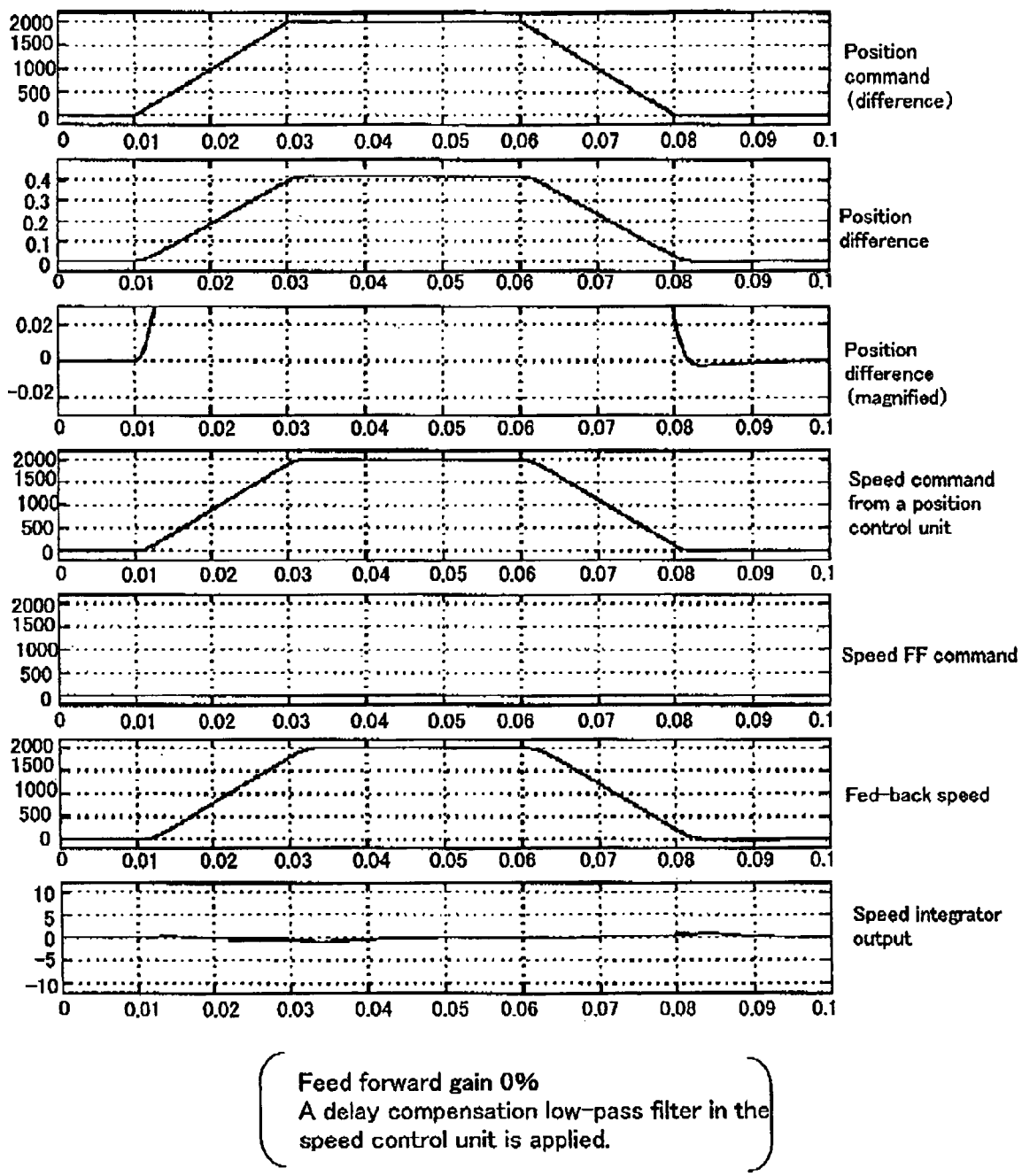
FIG. 18 shows a result of a simulation of a position controlling operation when a delay compensation low-pass filter in a speed control unit is applied and a feed forward gain is set to 0 in embodiments of FIG. 9 and FIG. 10.
Figure 19:
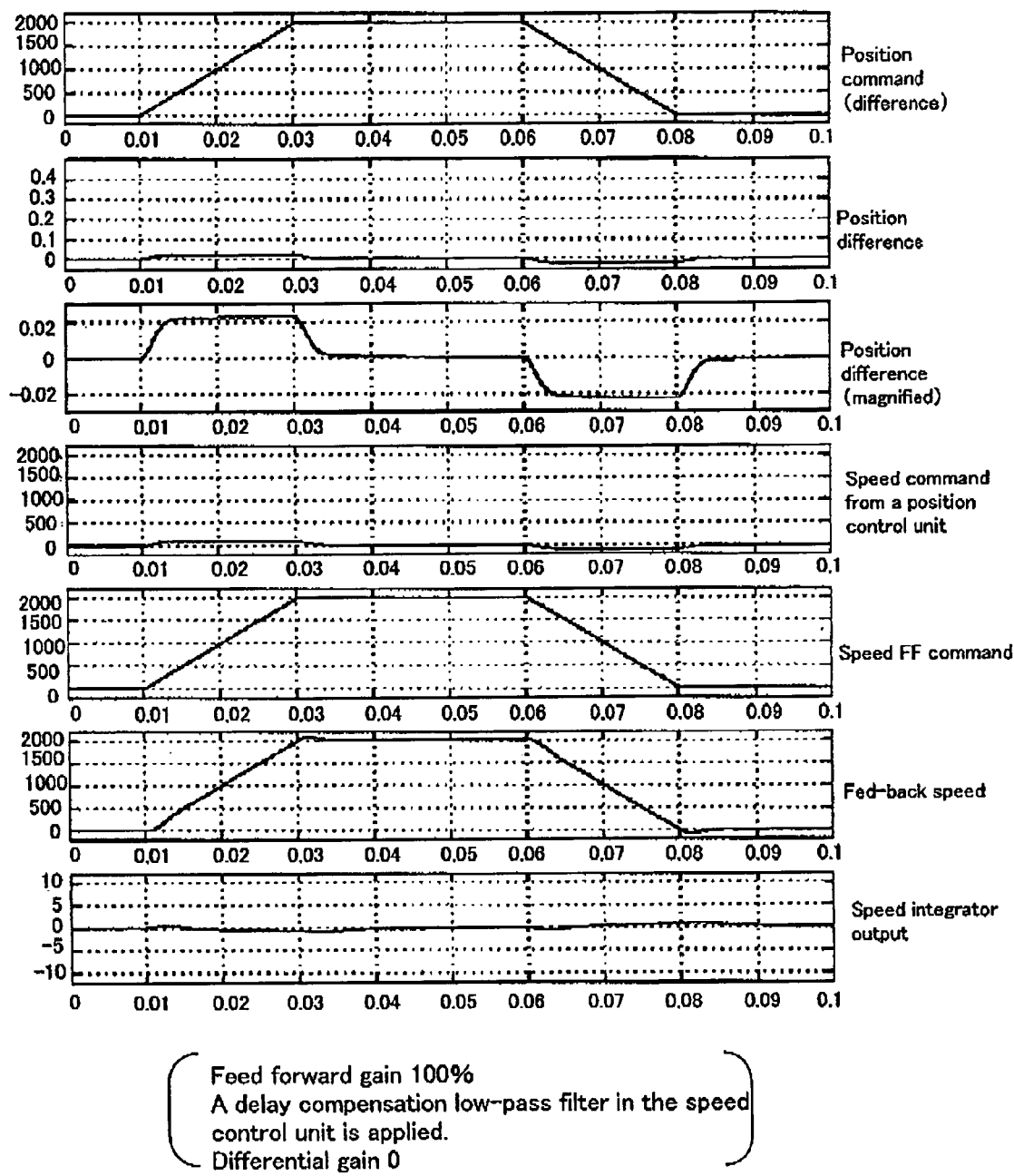
FIG. 19 shows a result of a simulation of a position controlling operation when a differential gain is set to 0 and a feed forward gain is set to 100%, basing on conditions designated in FIG. 18.
Figure 20:
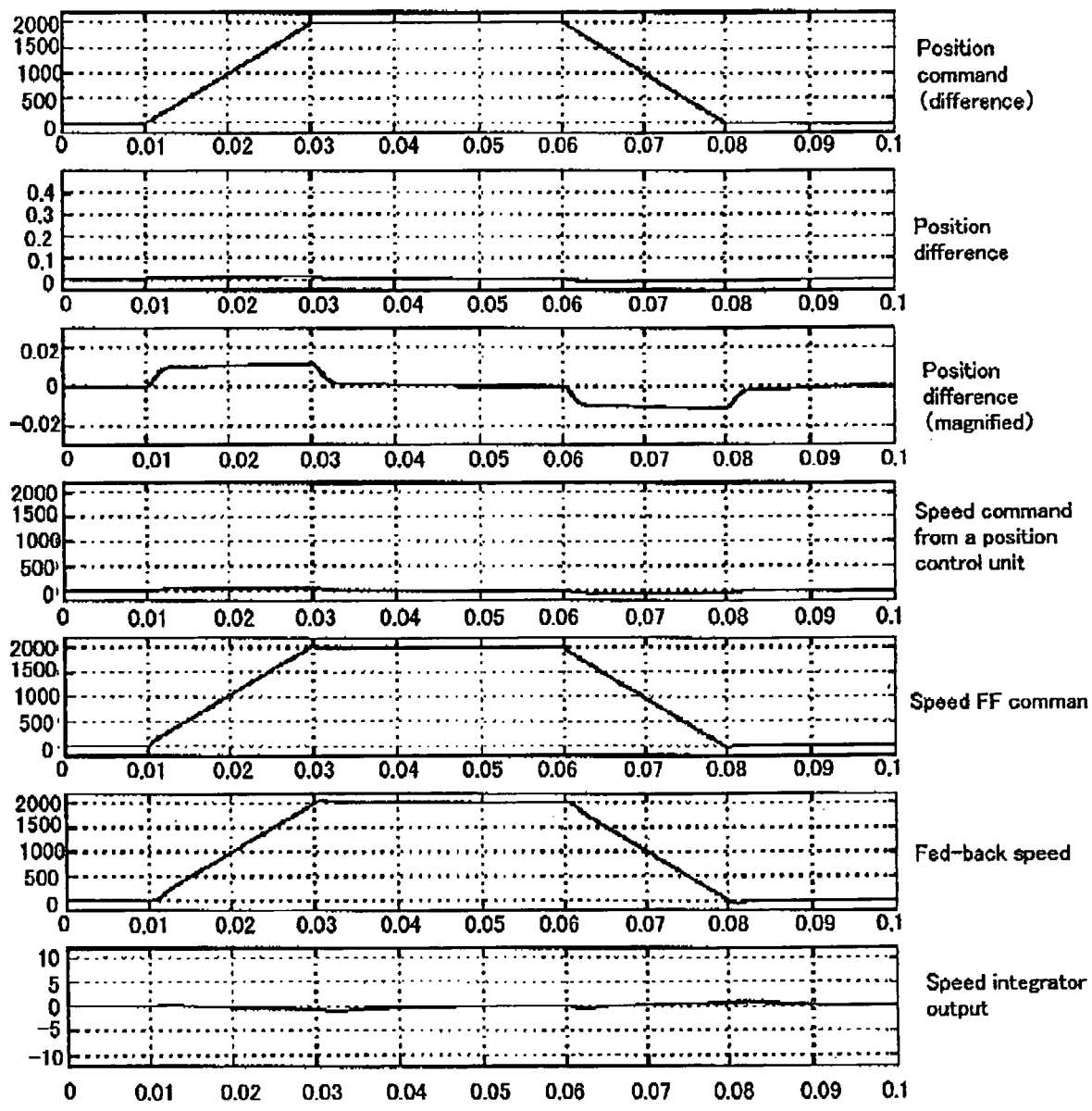
FIG. 20 shows a result of a simulation of a position controlling operation when a differential gain is set, basing on conditions designated in FIG. 19.
Figure 21:
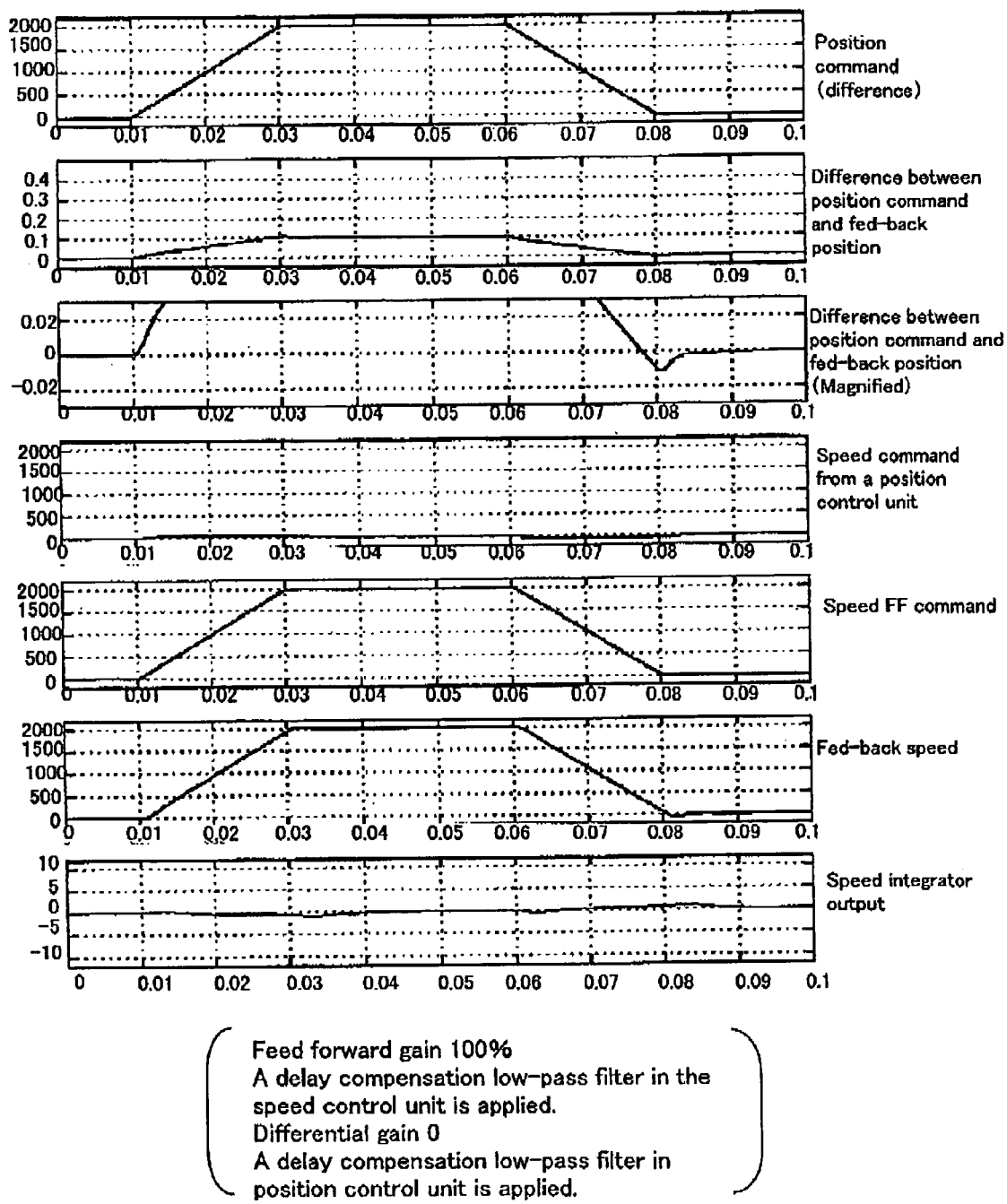
FIG. 21 shows a result of a simulation of a position controlling operation when a delay compensation low-pass filter in a position control unit is applied, basing on conditions designated in FIG. 19 as shown in a configuration in FIG. 13.
Figure 22:
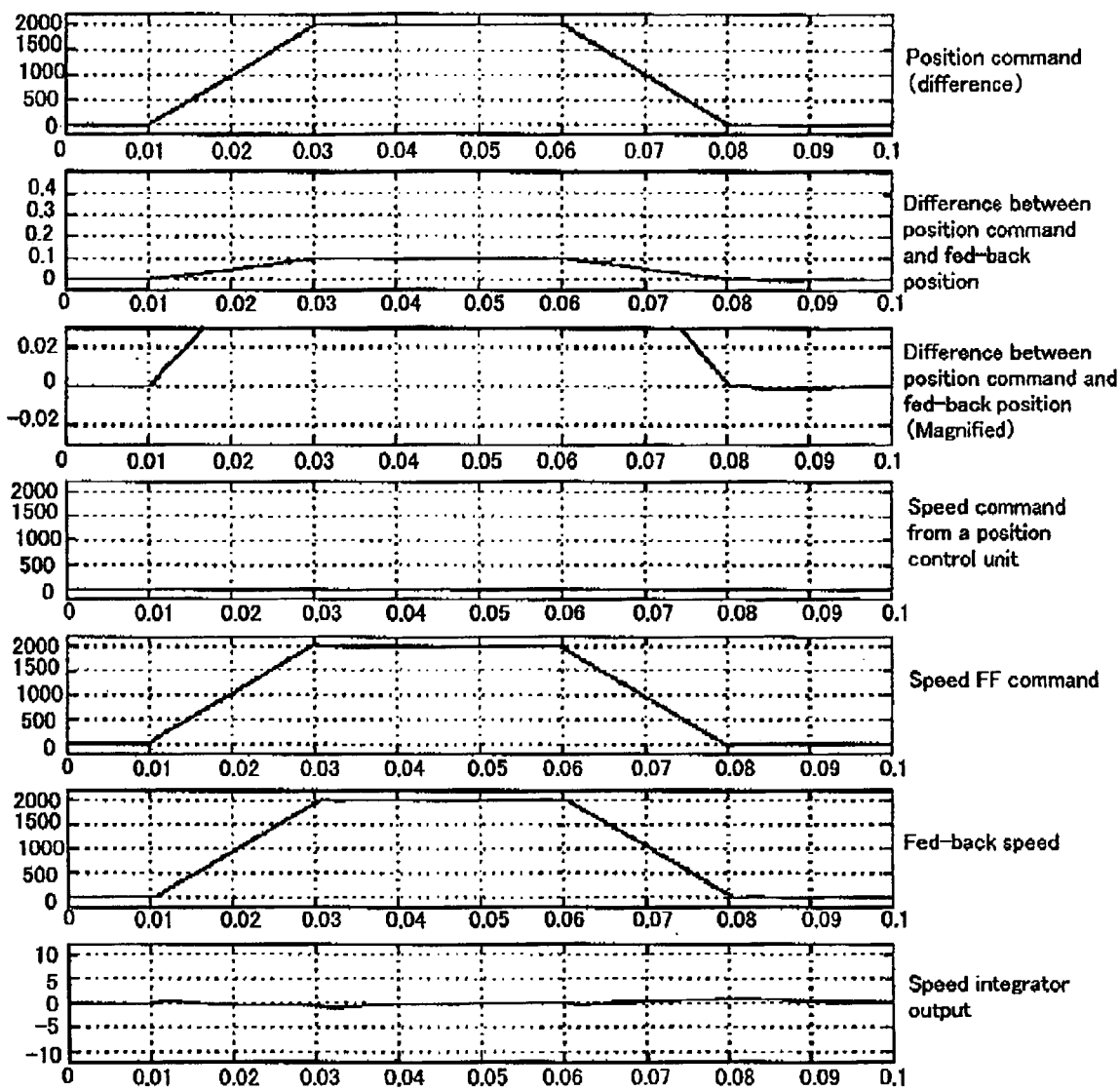
FIG. 22 shows a result of a simulation of a position controlling operation when a differential gain is set, basing on conditions designated in FIG. 21.

FIG. 18 shows a result of a simulation of a position controlling operation when a delay compensation low-pass filter 433 in a speed control unit is applied and a feed forward gain is set to 0 in embodiments of FIG. 9 and FIG. 10. Compared to an example of a conventional controller in FIG. 15, the residual quantity is found to be close to 0. FIG. 19 shows a result of a simulation of a position controlling operation when a differential gain is set to 0 and a feed forward gain is set to 100% with the conditions designated in FIG. 18. The conditions in FIG. 19 is found to increase an amount of a positional overshoot. FIG. 20 shows a result of a simulation of a position controlling operation when a differential gain is set with conditions designated in FIG. 19. Compared to FIG. 19, FIG. 20 shows that an amount of an overshoot decreases even when a feed forward gain is set to 100%. FIG. 21 shows a result of a simulation of a position controlling operation when a delay compensation low-pass filter 415 in a position control 415 unit is applied with conditions designated in FIG. 19 as shown in a configuration in FIG. 13. In FIG. 21, compared to FIG. 19, an amount of the overshoot decreases. In FIG. 22, a result of a simulation of a position control operation when a differential gain is input is shown with the conditions of FIG. 21. In FIG. 22, a speed command of the position control unit is almost 0 when increasing and decreasing speed. Although a feed forward gain is set to 100%, an overshoot is smaller, which shows that the followability is greatly improved. Finally, a position difference at a constant speed is decreased to about half a conventional feed forward gain of 50% as shown in FIG. 16, which shows us that the followability is improved to about 2 times compared to a conventional controller.

INDUSTRIAL APPLICABILITY

Since this invention uses a speed integration compensation low-pass filter, a difference between a speed indicated by the speed command having a delay corresponding to the delay of the speed control system and the speed of the actually delaying fed-back speed can be made close to zero, thereby rendering the residual quantity in the speed integrator almost zero. As the above mentioned, by using a controller of this invention, the residual quantity can be decreased. The controller of this invention, therefore, can decrease an overshoot and increase an integration gain by a simpler construction. Accordingly a speed controller with a higher response and ability of suppressing disturbance can be realized.

Since this invention uses a delay compensation low-pass filter in a current control unit, a difference between a current indicated by the delay current command having a delay corresponding to the delay of the current control system and the actually delaying fed-back current can be made close to zero, thereby rendering the residual quantity in the speed integrator almost zero. A current response, then, can be enhanced. The current controller of this invention, therefore, can decrease an overshoot and enhance a current response by a simpler construction.

Since this invention performs a proportional differential control for a feed forward multiplication output in a position control unit, a primary advance is characterized in the controller of this invention. The controller of this invention, therefore, can compensate a delay in a speed control system, and improve a followability to a position command. By using a delay compensation low-pass filter, a difference between a speed indicated by the speed command having a delay corresponding to the delay of the speed control system and the actually delaying fed-back speed can be made close to zero, thereby rendering the residual quantity in the speed integrator almost zero. Furthermore, when a feed back gain is increased to 100%, a control system with less overshoot can be realized. Accordingly, the position control with higher followabilty at high speed can be realized.

The invention claimed is:

1. A motor controller comprising:
   a current detecting unit for detecting a motor current to be controlled;
   a current control unit for outputting a voltage command, based on a current difference between a current indicated by a current command and a fed-back current based on the motor current detected by the current detector; and
   a driving means for supplying the motor current to the motor, based on the voltage command;
   wherein the current control unit comprises:
      a delay compensation low-pass filter in the current control unit having a transfer function corresponding to a delay of a current control system;
      an integral control system including a current integrator, the current integrator for integrating a current difference between the fed-back current and the current indicated by a delay current command, the delay current command being obtained by inputting the current command into the delay compensation low-pass filter in the current control unit;
      a proportional control system for outputting a command proportional to the current difference between the fed-back current and the current indicated by the current command;
      an addition means for adding an output of the integral control system and an output of the proportional control system; and
      a multiplication means for multiplying an output of the addition means by a current proportional gain to output the voltage command.

2. A motor controller comprising:
   a current detecting unit for detecting a motor current to be controlled;
   a current controlling unit for outputting a voltage command, based on a current difference between a current indicated by a current command and a fed-back current based on the motor current detected by the current detector; and
   a driving means for supplying the motor current, based on the voltage command;
   wherein the current control unit comprises:
      a delay compensation low-pass filter in the current control unit having a transfer function corresponding to a delay of a current control system;
      an integral control system including a current integrator, the current integrator for integrating a current difference between the fed-back current and a current indicated by a delay current command, the delay current command being obtained by inputting the current command into the delay compensation low-pass filter in the current control unit, the integral control system multiplying an operand in the integral control system by a current proportional gain to produce an output;

a proportional control system for outputting a command obtained by multiplying the current proportional gain by the current difference between the fed-back current indicated by the current command; and an addition means for adding an output of the integral control system and an output of the proportional gain.

3. A motor controller comprising:

a position detection unit for detecting a position of a motor to be controlled;

a speed calculation unit for calculating a speed of the motor from a position of the motor detected by the position detection unit;

a position control unit for performing a position control by outputting a speed command so that the motor position fed back from the position detection unit is consistent with a position indicated by a position command;

a speed control unit for performing a speed control, based on a proportional-integral control by outputting a torque command so that the speed fed back from the speed calculation unit is consistent with the speed indicated by the speed command; and a torque control unit for performing a torque control, based on the torque command;

wherein the position control unit comprises:

a subtraction means for calculating a position difference between the position indicated by the position command and the position detected by the position detection unit; and a position loop multiplication means for multiplying the position difference by a position proportional gain;

a differentiator for differentiating the position command;

a feed forward gain multiplication means for multiplying an output of the differentiator by a feed forward gain;

a proportional differentiation means for controlling an output of the feed forward gain multiplication means based on a proportional differentiation control to compensate a delay of a speed control system;

a feed forward low-pass filter having a transfer function for removing ripples caused by quantization errors in the position command, and the feed forward low-pass filter filtering an added value of an output of the proportional differentiation means and an output of the feed forward gain multiplication means; and an addition means for adding an output of the feed forward low pass filter and an output of the position loop multiplication means to output the speed command.

4. The motor controller according to claim 3, further comprising a delay compensation low-pass filter in the position control unit having a transfer function corresponding to a delay of the speed control system:

wherein the position command is input into the subtraction means through the delay compensation low-pass filter in the position control unit.

5. The motor controller according to claim 3, wherein the speed control unit comprises:

a compensation low pass filter in a speed control unit having a transfer function corresponding to a delay of the speed control system;

an integral control system including a speed integrator, the speed integrator for integrating a speed difference between the speed of the motor and a speed indicated by a delay speed command, the delay speed command being obtained by inputting the speed command into the delay compensation low-pass filter in the speed control unit;

a proportional control system for outputting a command proportional to a difference between the speed indicated by the speed command and the speed of the motor;

an addition means for adding an output of the integral control system and an output of the proportional control system; and a multiplication means for multiplying an output of the addition means by a speed proportional gain to produce the torque command.

6. The motor controller according to claim 3, wherein the speed control unit comprises:

a compensation low pass filter in a speed control unit having a transfer function corresponding to a delay of the speed control system;

an integral control system including a speed integrator, the speed integrator for integrating a speed difference between the speed of the motor and a speed indicated by a delay speed command, the delay speed command being obtained by inputting the speed command into the delay compensation low-pass filter in the speed control unit, the integral control system multiplying an operand in the integral control system by a speed proportional gain to produce an output;

a proportional control system for outputting a command by multiplying a difference, between the speed indicated by the speed command and the speed of the motor, by a speed proportional gain; and an addition means for adding an output of the integral control system and an output of the proportional control system.

7. The motor controller according to claim 4, wherein the speed control unit comprises:

a compensation low pass filter in a speed control unit having a transfer function corresponding to a delay of the speed control system;

an integral control system including a speed integrator, the speed integrator for integrating a speed difference between the speed of the motor and a speed indicated by a delay speed command, the delay speed command being obtained by inputting the speed command into the delay compensation low-pass filter in the speed control unit;

a proportional control system for outputting a command proportional to a difference between the speed indicated by the speed command and the speed of the motor;

an addition means for adding an output of the integral control system and an output of the proportional control system; and a multiplication means for multiplying an output of the addition means by a speed proportional gain to produce the torque command.

8. The motor controller according to claim 4, wherein the speed control unit comprises:
- a compensation low pass filter in a speed control unit having a transfer function corresponding to a delay of the speed control system;
- an integral control system including a speed integrator, the speed integrator for integrating a speed difference between the speed of the motor and a speed indicated by a delay speed command, the delay speed command being obtained by inputting the speed command into the delay compensation low-pass filter in the speed control unit, the integral control system multiplying an operand in the integral control system by a speed proportional gain to produce an output;
- a proportional control system for outputting a command by multiplying a difference, between the speed indicated by the speed command and the speed of the motor, by a speed proportional gain; and
- an addition means for adding an output of the integral control system and an output of the proportional control system.

9. A motor controller, comprising:
- a position detection unit for detecting a position of a motor to be controlled;
- a speed calculation unit for calculating a speed of the motor;
- a position control unit for outputting a speed command to control a position so that the motor position fed back from the position detection unit is consistent with a position indicated by a position command;
- a speed control unit for outputting a torque command to control a speed, based on a proportional-integral control so that the speed fed back from the speed calculation unit is consistent with the speed indicated by the speed command; and
- a torque control unit for performing a torque control, based on the torque command;
- wherein the position control unit comprises:
  - a differentiator for differentiating the position command;
  - a feed forward gain multiplication means for multiplying an output of the differentiator by a feed forward gain;
  - a proportional differentiation means for controlling an output of the feed forward gain multiplication means, based on a proportional differentiation control to compensate a delay of a speed control system;
  - a feed forward low pass filter having a transfer function for removing ripples caused by quantization errors in the position command, and filtering an added value of an output of the proportional differentiation means and an output of the feed forward gain multiplication means; and
  - an integrator for integrating a difference between an output of the differentiator and a differential value of the position detected by the position detection unit, to output a position difference;
  - a position loop multiplication means for multiplying an output of the integrator by a position proportional gain; and
  - an addition means for adding a command outputted from the position loop multiplication means and a speed feed forward command outputted from the feed forward low pass filter to output the speed command.

10. The motor controller according to claim 9,
- wherein the delay compensation low-pass filter in the position control unit having a transfer function corresponding to a delay of the speed control system is arranged between the differentiator and the integrator;
- wherein a difference between an output of the differentiator that has passed through the delay compensation low-pass filter in the position control unit and a differential value of the position is inputted into the integrator.

* * * * *

UNITED STATES PATENT AND TRADEMARK OFFICE
CERTIFICATE OF CORRECTION

PATENT NO. : 7,265,511 B2 Page 1 of 1
APPLICATION NO. : 10/549727
DATED : September 4, 2007
INVENTOR(S) : Ide It is certified that error appears in the above-identified patent and that said Letters Patent is hereby corrected as shown below:

On the Title Page, item [57], ABSTRACT, Line 3, after "device", delete "means".

Signed and Sealed this

Twentieth Day of November, 2007

JON W. DUDAS
*Director of the United States Patent and Trademark Office*